US012783262B1

(12) United States Patent
Galyen et al.

(10) Patent No.: US 12,783,262 B1
(45) Date of Patent: Nov. 3, 2026

(54) NETWORK-ORCHESTRATED SERVER SYSTEM FOR HIERARCHICAL REUSABLE OBJECTS AND AI-DRIVEN CONTENT GENERATION

(71) Applicant: iDesignEDU, Inc., Dallas, TX (US)

(72) Inventors: Krista Galyen, Columbia, MO (US); Whitney Kilgore, Valley View, TX (US); Paxton Riter, Dallas, TX (US); Edward Stone, Dallas, TX (US)

(73) Assignee: iDesignEDU, Inc., Dallas, TX (US)

( * ) Notice: Subject to any disclaimer, the term of this patent is extended or adjusted under 35 U.S.C. 154(b) by 0 days.

(21) Appl. No.: 19/568,430

(22) Filed: Mar. 16, 2026

Related U.S. Application Data

(60) Provisional application No. 63/981,926, filed on Feb. 13, 2026.

(51) Int. Cl.
*G06F 9/448* (2018.01)
*G06F 8/10* (2018.01)
*G06F 8/20* (2018.01)

(52) U.S. Cl.
CPC .............. *G06F 9/4492* (2018.02); *G06F 8/10* (2013.01); *G06F 8/24* (2013.01)

(58) Field of Classification Search
CPC ............. G06F 9/4492; G06F 8/10; G06F 8/24
See application file for complete search history.

(56) References Cited

U.S. PATENT DOCUMENTS

| | | | | |
|---|---|---|---|---|
| 6,853,997 | B2 * | 2/2005 | Wotring | G06F 16/94 707/999.1 |
| 11,360,993 | B1 * | 6/2022 | Prasad | G06F 9/541 |
| 11,960,507 | B2 * | 4/2024 | Coleman | G06F 16/2246 |

* cited by examiner

*Primary Examiner* — Andrey Belousov
(74) *Attorney, Agent, or Firm* — Foley & Lardner LLP

(57) ABSTRACT

A method may generate reduced-error structured content across a network using reusable objects by constraining a content generation model with hierarchical and classification metadata. The method includes, responsive to a client request for a target content element at a second level of a hierarchical data model, determining a subset of reusable objects available at the second level based on inheritance metadata for reusable objects at a first level. The method further includes retrieving alignment relationships from an alignment data store to identify specification items linked to the target content element and selecting a candidate classification object including structured classification data indicating required terms. The method further includes assembling an input sequence including hierarchical context, a selected reusable object, and the candidate classification object, transmitting the input sequence to obtain a content element definition, and storing the content element definition in association with the linked specification items.

20 Claims, 6 Drawing Sheets

500

First Criteria - Alignment Analysis

| Standard | Status | Skill Level | Reason | Items to Address |
|---|---|---|---|---|
| XYZXYZ XYZXYZ XYZXYZ XYZXYZ XYZXYZ XYZXYZ | Not Meet | Low | XYZXYZ XYZXYZ XYZXYZ XYZXYZ XYZXYZ XYZXYZ | XYZXYZ XYZXYZ XYZXYZ XYZXYZ XYZXYZ XYZXYZ |

510

Second Criteria Analysis

| Standard | Status | Skill Level | Reason | Items to Address |
|---|---|---|---|---|
| XYZXYZ XYZXYZ XYZXYZ XYZXYZ XYZXYZ XYZXYZ | Meet | High | XYZXYZ XYZXYZ XYZXYZ XYZXYZ XYZXYZ XYZXYZ | |

540

*FIG. 5*

NETWORK-ORCHESTRATED SERVER SYSTEM FOR HIERARCHICAL REUSABLE OBJECTS AND AI-DRIVEN CONTENT GENERATION

CROSS-REFERENCE TO RELATED APPLICATIONS

This application claims priority to provisional application 63/981,926, filed Feb. 13, 2026, the entirety of which is incorporated herein.

BACKGROUND

Network-based content creation platforms are commonly deployed as multi-tenant services. Client devices such as laptops, tablets, and workstations communicate with application servers over communication networks like the Internet. The application servers can interact with remote services, including external content generation services and alignment or catalog services. These remote services may maintain relationships between different types of specification items, such as outcomes, objectives, or skills. Hierarchical data models, reusable templates or objects, and classification frameworks can be stored in centralized repositories. The centralized repositories are typically accessed by the servers or client devices via network APIs. As a result, creating and managing structured digital artifacts often involves combining hierarchical context, configuration information, alignment data, and classification information. This combination of information can occur across multiple distributed components of a networked computing system.

SUMMARY

Some embodiments may configure a computer system to generate a content element definition for a target content element using an input sequence that the computer system assembles. The input sequence includes information derived from hierarchical reusable objects, alignment relationships between generated content elements and specification items, and a classification object that the computer system selects based on associations between the specification items and classification objects. In some implementations, the computer system may perform, in response to a request received from a client device, operations that use the input sequence. The request specifies the target content element associated with a second level of a hierarchical data model that includes multiple levels. In response, the computer system may determine, based on inheritance metadata for a plurality of reusable objects associated with the first level, a subset of reusable objects available for use at the second level. Additionally, the computer system may identify, by accessing an alignment service specifying alignment relationships between generated content elements and specification items, a subset of specification items linked to the target content element using the alignment relationships.

The computer system may select, based on associations between the specification items and classification objects of the plurality of reusable objects, a candidate classification object associated with the subset of the specification items. Thereafter, the computer system may assemble, at one or more servers, the input sequence for a content generation model using the candidate classification object. In some embodiments, the input sequence may include information representing hierarchical context derived from the subset of reusable objects and information representing a reusable object selected from the subset of reusable objects. The computer system selects the reusable object based on an association between the reusable object and the target content element. Subsequently, the computer system may transmit the input sequence to the content generation model to obtain the content element definition for the target content element. Furthermore, the computer system may store the content element definition in association with the subset of the specification items linked to the target content element by the alignment relationships.

By performing the described operations and using related devices, a computer system may automatically integrate hierarchical reusable object inheritance and alignment relationships from a list alignment data structure. The system may further incorporate classification objects into input sequences for a content generation model. As a result, the content generation model may produce reduced-error content element definitions that remain consistently associated with specification items in a networked content platform.

Various other aspects, features, and advantages of the invention will be apparent through the detailed description of the invention and the drawings attached hereto. It is also to be understood that both the foregoing general description and the following detailed description are examples and are not restrictive of the scope of the invention.

BRIEF DESCRIPTION OF THE DRAWINGS

FIG. 5 depicts a reusable object used for evaluation and outputs derived from the applying the reusable object to generated content element definitions, in accordance with one or more embodiments.

Figure 1:
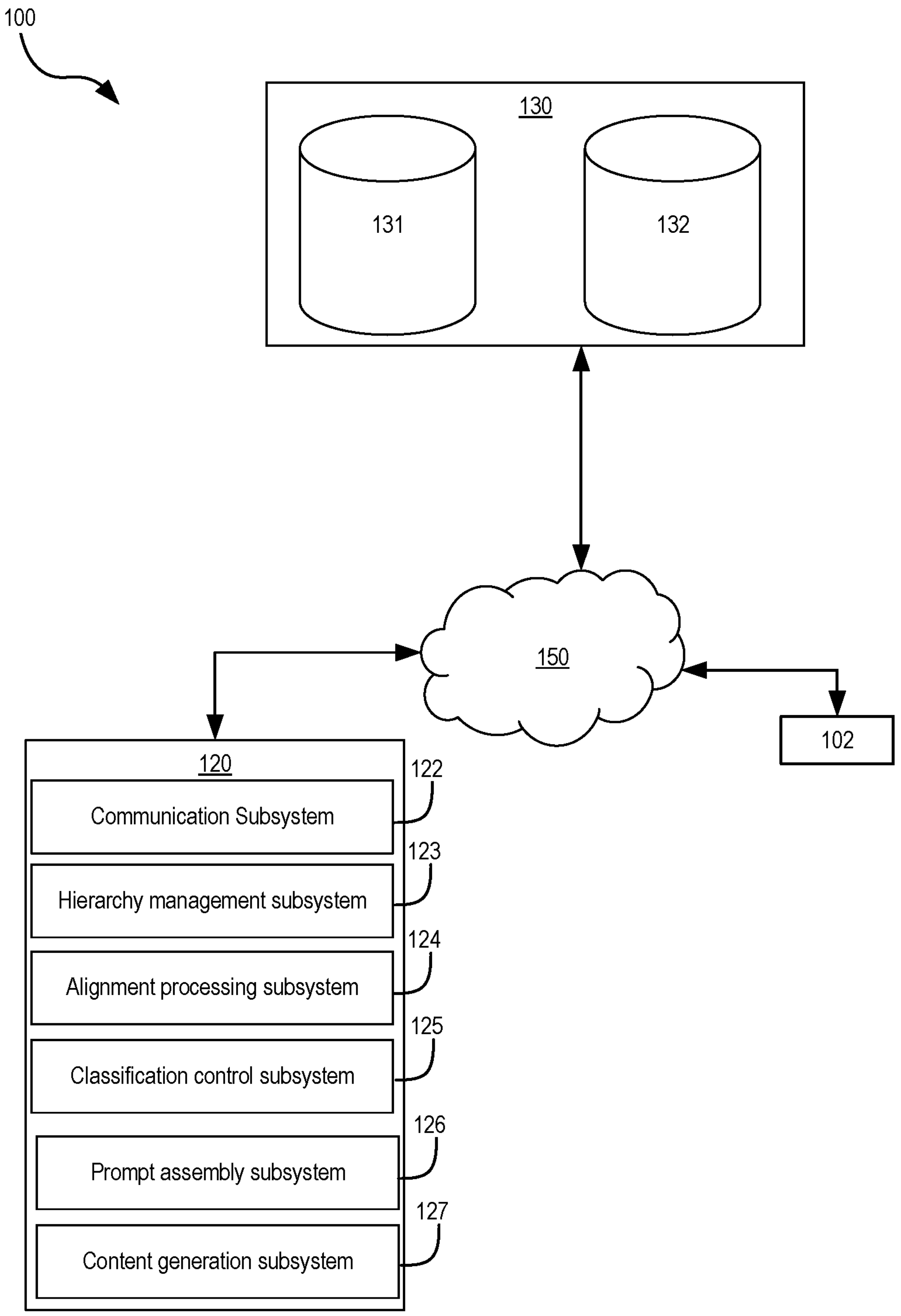
FIG. 1 shows a system for managing hierarchical reusable objects, assembling classification constrained input sequences for a content generation model, and storing aligned content element definitions, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Content generation systems typically suffer from high error rates when generating structured content tied to complex specifications. These errors arise because generic generation models lack awareness of hierarchical inheritance rules, specification-level alignment, and classification constraints that govern permissible terminology and structure. As a result, generated content often omits required terms, misclassifies content elements, or diverges from specification requirements, requiring costly manual review and correction. Existing systems also fail to reuse institutional knowledge embedded in reusable objects or to enforce mandatory constraints across hierarchy levels, leading to inconsistency and reduced reliability in network-based content generation.

The systems and methods described herein resolve these technical problems through a server-based architecture that dynamically constrains content generation using reusable objects and classification data derived from hierarchical inheritance metadata. When a request specifies a target content element at a second level of a hierarchical data model, a computing system determines a subset of reusable objects available at that level based on inheritance rules. The computing system identifies specification items aligned to the target content element and selects a candidate classification object associated with those specification items. By assembling an input sequence that includes hierarchical context, a relevant reusable object, and structured classification data specifying required terms at a corresponding classification level, the computing system technically constrains the content generation model itself. This constraint materially reduces generation errors by forcing the model to comply with required terminology and structure during generation, rather than relying on post-hoc correction.

In some cases, the computing system can implement reusable objects that specify evaluation criteria and enable automated review and revision of generated content. After initial generation, the computing system assembles a review input sequence comprising the content element definition and a selected evaluation object, and obtains review output identifying parameters for modification. The computing system then automatically generates a revised content element definition based on those parameters. This feedback loop transforms the content generation model into a self-correcting technical system, enabling objective quality metrics to influence reusable object selection and future generations. By embedding evaluation logic directly into reusable objects, the system further reduces error propagation and increases consistency across network-generated structured content.

FIG. 1 shows a system 100 for managing hierarchical reusable objects, assembling classification constrained input sequences for a content generation model, and storing aligned content element definitions, in accordance with one or more embodiments. The system 100 includes a client device 102 in communication with a server 120 via a network 150. As will be described further in this disclosure, the server 120 may perform operations to manage hierarchical reusable objects, construct constrained model input sequences, and store alignment linked content definitions for later retrieval and analysis.

The system 100 may manage hierarchical reusable objects, alignment relationships, and classification constraints and may create and store content element definitions aligned with formal specification items, such as technical requirements, API definitions, or compliance rules. In addition, the system 100 may determine, based on inheritance metadata, a subset of reusable objects available at a specific level in a hierarchical data model, such as organization to product line. By filtering objects according to allowed levels, the system 100 may enforce scoped reuse. The system 100 may prevent configuration intended for one scope from affecting another scope. For example, the system 100 may determine that a product-line-level documentation request can use only section templates and style rules inherited and explicitly enabled for that product line. The system 100 may further determine that the product-line-level documentation request cannot use reusable objects belonging to other product lines. Moreover, inheritance-based selection may improve structural consistency of generated content across related products. In addition, inheritance-based selection may reduce duplication and misconfiguration of reusable objects.

The system 100 may retrieve alignment relationships from an alignment data store to identify specification items linked to a target content element and may use those items as required anchors during generation. In addition, the system 100 may select a candidate classification object associated with those specification items. The classification object may contain structured classification data, including required terms and patterns for a particular classification level, such as a severity level for security issues or a standard wording scheme for risk statements. For instance, when the target content element type is “security advisory” aligned to high-severity security requirements, the system 100 may select a classification object entry for “High severity” that requires specific phrases such as “MUST” or “CRITICAL” and blocks weaker terms such as “MAY” or “OPTIONAL.” By using alignment data to choose classification objects and by enforcing required terms for the corresponding classification level, the system 100 may reduce use of inappropriate terminology and may increase accuracy and consistency of output with the intended severity or classification associated with linked specification items.

The system 100 may assemble an input sequence for a content generation model. The input sequence may combine hierarchical context derived from inheritance-filtered reusable objects and a specific reusable object associated with a target content element type, such as an “API advisory” template. The input sequence may also combine a candidate classification object that contains level-specific structured data and required terms. The system 100 may send the combined sequence to the content generation model. The system 100 may then obtain a content element definition that follows structural fields and terminology constraints defined by the reusable objects. For example, the system 100 may include organization-level documentation standards when constructing the input sequence. The system 100 may also include product-line style rules and an endpoint-advisory template. Continuing this example, the system 100 may include “High severity” wording rules when requesting generation of a security notice for a specific API endpoint. The system 100 may then receive a structured advisory with standard sections such as summary, impact, affected endpoints, and remediation. The structured advisory may include only approved severity phrasing. By building and sending an object-driven input sequence instead of an ad hoc prompt, the system 100 may increase structural accuracy of generated technical content. The system 100 may also increase repeatability of generated technical content across one or more similar requests.

The system 100 may store a resulting content element definition together with a subset of specification items linked to a target content element and with metadata indicating a classification level and a classification object used during generation. In addition, the system 100 may save a generated API security advisory together with references to exact requirements and security controls addressed, along with an indication that a "High severity" classification object served as the classification object during generation. By storing the content element definition with clear links to specification items and with classification metadata enforced during generation, the system 100 may preserve end-to-end alignment and may support reliable compliance reporting, gap detection, and change impact analysis based on accurate and consistent technical content.

The system 100 includes various types of electronic devices, such as the client device 102. The client device 102 may include one of various types of computer devices usable as a client-side device, such as a laptop, data terminal, mobile computing device, etc. The client device 102 may send requests, responses, or other messages to the server 120 that may require communication with other computing devices or other electronic devices. The server 120 includes a network interface configured to communicate over communication networks, enabling reception of requests from client devices and transmission of responses and data. Additionally, the server 120 may include various types of computing units, such as physically separate servers, virtual nodes hosted on one or more physical machines, or nodes on a cloud computing system. Applications, services, or other operations may use data provided by the client device 102, the server 120, or a set of databases 130 that includes a first networked database 131 and a second networked database 132. The set of databases 130 may include various types of databases, such as SQL databases, no SQL databases, graph databases, etc. In some embodiments, the server 120 may perform one or more operations related to a communication subsystem 122, a hierarchy management subsystem 123, an alignment processing subsystem 124, a classification control subsystem 125, a prompt assembly subsystem 126, and a content generation subsystem 127.

In some embodiments, the system 100 may operate as a multi-tenant service in which a plurality of tenants, partners, or organizations share the same server infrastructure while maintaining logically separated reusable object libraries and hierarchical data models. For a set of reusable objects, each reusable object may include a tenant identifier or organization identifier and an optional shared flag that indicates whether the reusable object is available to multiple tenants. When the hierarchy management subsystem 123 determines a subset of reusable objects for a given level in the hierarchical data model, the hierarchy management subsystem 123 may filter the plurality of reusable objects by tenant identifier to exclude reusable objects owned by other tenants while including reusable objects designated as shared. The hierarchy management subsystem 123 may then apply inheritance metadata within the filtered set to determine which reusable objects propagate to the relevant program, course, or activity scopes. As a result, different tenants may use distinct sets of reusable design objects (RDOs), reusable quality objects (RQOs), classification objects, time estimation reusable objects, and reusable build objects (RBOs), while sharing selected base taxonomies or other objects, and the system may enforce isolation and data separation across tenants by controlling which reusable objects are surfaced and used when assembling input sequences and generating content element definitions.

The communication subsystem 122 may manage reception of requests from client devices via a communication network and may parse incoming messages to identify a target content element and a corresponding level in the hierarchical data model. For example, the communication subsystem 122 may receive a request from an instructional designer's browser that specifies a quiz question block at a course level and may extract identifiers for the course-level content element and user session. The communication subsystem 122 may route a request to other subsystems to perform one or more operations described in this disclosure. For example, the communication subsystem 122 may route a parsed request for inheritance analysis, alignment retrieval, or content generation orchestration. The communication subsystem may use a network interface to perform such operations. The network interface may facilitate communication with client devices and external systems over a communication network, including Internet connections and other protocols.

The hierarchy management subsystem 123 may determine a subset of reusable objects that is available for use at the second level of the hierarchical data model. The hierarchy management subsystem 123 may evaluate inheritance metadata indicating associations between the first level and the second level for a plurality of reusable objects associated with the first level. For example, the hierarchy management subsystem 123 may determine that a set of organization-level design templates and voice profiles inherit to a particular program-level course and may output a filtered subset of the reusable objects as context available for a quiz question block. In addition, the hierarchy management subsystem 123 may filter the plurality of reusable objects to identify the subset of reusable objects that inherit to the second level and may provide hierarchical context data that describes the subset of reusable objects.

In some embodiments, the hierarchy management subsystem 123 may maintain an index over the reusable object repository to support efficient discovery of reusable objects in large deployments. In addition, the index may support efficient selection of reusable objects in large deployments. For example, the index may store, for each reusable object, fields such as an object identifier, a type indicator, and one or more activity types. The index may also store supported module structure elements, associated taxonomy identifiers, and applicable platform identifiers. Moreover, the index may store quality metrics and ownership metadata, including tenant or organization identifiers. The hierarchy management subsystem 123 may use the index to execute multi-field queries. The multi-field queries may identify candidate reusable objects that match a combination of constraints, such as object type and hierarchical level. The combination of constraints may also include compatible activity type and tenant identifier. The hierarchy management subsystem 123 may perform these operations without scanning the entire repository.

In some embodiments, user interface (UI) components associated with the system 100 may query the same index to present filtered, paginated lists of reusable objects to users. A design interface may enable a user to apply one or more filters, such as object type, category, level in the hierarchical data model, or associated classification system. The design interface may receive from the hierarchy management subsystem 123 a sorted subset of matching reusable objects. In addition, the system 100 may order the subset according to quality metrics, usage frequency, or administrator-defined priorities. The system 100 may also present the highest-ranked reusable objects as recommended options to users. For example, when dozens of RDOs are compatible with a particular activity type, the design interface may surface a small set of recommended patterns based on quality scores. In addition, the design interface may allow users to browse a complete set of compatible reusable objects using indexed fields exposed in the design interface. Alternatively, or additionally, the design interface may allow users to search the complete set of compatible reusable objects using the indexed fields.

The alignment processing subsystem 124 may access an alignment data store to retrieve alignment relationships between generated content elements and specification items. The alignment processing subsystem 124 may identify, using the alignment relationships, a subset of the specification items that is linked to the target content element. For example, the alignment processing subsystem 124 may query an alignment graph to determine that a designated content element instance is linked to four distinct specification items, and the alignment processing subsystem 124 may return those specification items as the alignment context. In addition, the alignment processing subsystem 124 may provide the identified subset of specification items to other subsystems so that subsequent classification operations and content generation processes remain associated with the same linked specification items.

The classification control subsystem 125 may select a candidate classification object that is associated with the subset of the specification items. The classification control subsystem 125 may evaluate associations between the specification items and classification objects within the plurality of reusable objects to determine a classification object corresponding to the linked specification items. For example, the classification control subsystem 125 may identify that the linked specification items are labeled with a particular classification level (e.g., a designated level code) and may select a taxonomy-type classification object whose structured classification data specifies that level and associated required tokens, patterns, or attributes. In addition, the classification control subsystem 125 may access structured classification data indicating required terms or features and may identify a portion of the structured classification data corresponding to a classification level associated with the subset of the specification items.

The prompt assembly subsystem 126 may assemble an input sequence for a content generation model using outputs from the other subsystems. The prompt assembly subsystem 126 may incorporate hierarchical context derived from the subset of reusable objects. The prompt assembly subsystem 126 may also incorporate a reusable object selected from the subset of reusable objects based on an association between the reusable object and the target content element. In addition, the prompt assembly subsystem 126 may incorporate the candidate classification object.

For example, the prompt assembly subsystem 126 may merge: (i) a reusable template object inherited through the hierarchical data structure and associated with a particular content element type, and (ii) a selected classification object corresponding to a specified classification level, into a single prompt sequence. The prompt assembly subsystem 126 may further merge additional structured context elements, such as a set of aligned target specifications, into the same prompt sequence. The resulting prompt sequence may instruct the content generation model to generate output that conforms to constraints defined by the classification level, including required terms derived from the classification object. Furthermore, the prompt assembly subsystem 126 may embed, within the prompt sequence, a portion of the structured classification data corresponding to the selected classification level. The required terms and embedded classification data may constrain behavior of the content generation model, thereby increasing the likelihood of reducing generation errors.

In some embodiments, the prompt assembly subsystem 126 may implement a staged injection pipeline that introduces different reusable objects and contextual information at different portions of an input sequence for the content generation model. The prompt assembly subsystem 126 may first insert system-level instructions and one or more style-constraint reusable objects that define global tone rules, sentence length constraints, or prohibited terms. The prompt assembly subsystem 126 may then append top-level (e.g., "organization-level" in an educational programming domain) and intermediate level (e.g., "program-level" in the educational programming domain) context, including program requirements, platform parameters, and references to locked reusable objects selected at the program level. The prompt assembly subsystem 126 may next insert lower level (e.g., "course-level" in the educational programming domain) context such as course descriptions, module identifiers, and course-specific reusable objects.

For a specific target content element at a leaf level (e.g., "activity level" in the educational programming domain), the prompt assembly subsystem 126 may then supply activity-level parameters including an activity type, a module structure element, estimated time constraints, and a selected RDO. The prompt assembly subsystem 126 may embed the directions, template, and example from the selected RDO into the input sequence. In addition, the prompt assembly subsystem 126 may combine a user request and a classification object whose structured classification data specifies terms and patterns associated with a classification level for specification items aligned to the target content element. By layering these injections in a defined order, the prompt assembly subsystem 126 may cause the content generation model to generate outputs that simultaneously satisfy global style constraints, organization and program requirements, reusable design patterns, and classification-level term constraints.

In some embodiments, an input sequence may include instructions directing the content generation model not to use specific verbs, phrases, or stylistic features. Such instructions may identify specified terms that the content generation model is required to exclude or include, enforcing vocabulary consistency aligned with organizational standards. By embedding specified terms into these instructions, a computer system may constrain a model's output to use language that complies with regulatory or classification requirements. For example, an explicit definition of specified terms for inclusion or prohibition in the input sequence reduces ambiguity and enhances accuracy of generated technical content.

For example, when generating a practice activity at an activity level for a course in a program, the prompt assembly subsystem 126 may construct an input sequence. The input sequence may include multiple layers of reusable objects and hierarchical context. At a first portion of the input sequence, the prompt assembly subsystem 126 may insert a personality reusable object selected at the program level. The personality reusable object may specify tone, sentence length constraints, and domain-specific terminology for the program. At a subsequent portion of the input sequence, the prompt assembly subsystem 126 may include organization-level and program-level context such as accreditation requirements, preferred instructional approaches, and platform parameters.

The prompt assembly subsystem 126 may then include course-level context such as a course description, module identifiers, and a list of aligned specification items. For example, the aligned specification items may include learning objectives associated with a target content element as retrieved by the alignment processing subsystem 124. The prompt assembly subsystem 126 may next insert, into the input sequence, a RDO selected from the subset of reusable objects available at the course level that corresponds to the activity type. The prompt assembly subsystem 126 may embed the RDO's directions, template, and example into the input sequence. In addition, the prompt assembly subsystem 126 may include a classification object corresponding to a taxonomy level associated with the aligned specification items. In some embodiments, the prompt assembly subsystem 126 may embed permitted words and patterns or required words and patterns from the taxonomy level into the input sequence. Finally, the prompt assembly subsystem 126 may append user-specified instructions or content-element-specific parameters. The appended information may form a combined input sequence that constrains a content generation model to produce a content element definition consistent with style, structural, and classification requirements.

In some embodiments, the system 100 may use multiple content generation calls in a sequence to support design, review, and build phases for a target content element. In a first call, the prompt assembly subsystem 126 may assemble an input sequence that comprises hierarchical context, a selected personality reusable object, one or more RDOs, and a classification object. The content generation subsystem 127 may then obtain an initial content element definition for the target content element from the content generation model.

In a second call, the prompt assembly subsystem 126 may assemble a review input sequence that includes the previously generated content element definition and one or more selected RQOs. The content generation subsystem 127 may then obtain a review output comprising one or more scores, associated rationale, and parameters for modifying the content element definition. The one or more selected RQOs may encode machine-readable evaluation criteria, including but not limited to structural consistency, specification conformance, accessibility constraints, or presentation rules. The content generation subsystem 127 may then obtain a review output that includes one or more scores, associated rationale, and recommended modifications represented in a defined schema. In a third call, used for platform-specific implementation, the prompt assembly subsystem 126 may assemble a build input sequence that includes the content element definition and a selected RBO. The selected RBO may specify a platform-specific implementation template and transformation rules. The content generation subsystem 127 may then obtain platform-specific implementation artifacts, such as markup, configuration data, or other executable code suitable for a target delivery environment. By orchestrating these sequences of calls, the system 100 may apply reusable object constraints at each stage of a lifecycle associated with the content element definition. The system 100 may maintain explicit associations between the content element definition, the structured review output, and the platform-specific implementation artifacts.

In some embodiments, style constraints inserted at the system prompt level may be represented as personality or voice reusable objects that encode tone and writing-style constraints for the content generation model. These personality reusable objects specify constraints on various textual characteristics including tone, vocabulary choice, formatting style, and sentence complexity to influence output. By embedding style-constraint reusable objects that govern textual characteristics into the input sequence, the system ensures consistent stylistic conformity across generated content elements.

As an example, a personality reusable object may include fields that specify an intended audience such as high school learners, undergraduate learners, graduate learners, or professionals. A personality reusable object may also include a tone descriptor such as formal, conversational, encouraging, direct, or technical. In addition, a personality reusable object may include one or more style parameters such as a sentence length parameter, preferred paragraph length, use of first-person or second-person constructions, and guidance on the amount of scaffolding and explanation to provide for new concepts. The personality reusable object may additionally include a list of phrases or terms to avoid, a list of preferred terminology for a domain or program, and one or more protocols for handling sensitive topics. Moreover, the personality reusable object may further specify an application scope that indicates whether the object should apply to all generated content for a program, only to certain content element types, or only to feedback-oriented content such as quality review explanations. By including these fields in a personality reusable object and injecting them at the system prompt level, the prompt assembly subsystem 126 may cause some or all subsequent content generation calls that reference that personality reusable object to adopt consistent tone, audience-appropriate language, and prohibited-term constraints.

In some embodiments, the system 100 may apply a personality reusable object to constrain the wording of explanatory content for a particular educational level. For example, before using a personality reusable object, a content generation model might generate a description of photosynthesis that recites: "Understanding the principles of photosynthesis is important for comprehending how plants produce energy." In addition, when the system 100 injects a personality reusable object configured for high school learners that specifies a conversational tone, a maximum sentence length, use of second-person pronouns, and a prohibition on the phrase "the principles of," the content generation model may instead produce a description such as: "You should learn phot Students will learn how plants make their own food in this lesson. Students should learn photosynthesis because it's important." Furthermore, the system 100 may store the identifier of the personality reusable object with the content element definition so that downstream evaluation processes can verify that generated content is consistent with selected style and tone constraints.

In some embodiments, a personality reusable object may be represented as a structured record that includes explicit style constraint fields that the system 100 may apply to generated content. For instance, the personality reusable object may include an audience field indicating a target learner population, such as high school learners or graduate learners, a tone field indicating one or more tone descriptors, such as conversational or formal, and one or more numeric constraint fields such as a "max_sentence_length" field specifying a maximum number of words per sentence and a "max_paragraph_sentences" field specifying a maximum number of sentences per paragraph. The personality reusable object may further include a "use_second_person" flag indicating whether content should be written in second-person voice, a "prohibited_terms" list indicating tokens or phrases that should not appear in generated content, and an optional "preferred_terms" mapping that associates recommended replacements with disfavored terms. A "sensitive_topic_protocols" field may specify behavioral rules for selected topics, such as using neutral clinical language for certain health topics. The prompt assembly subsystem 126 may inject these style constraints into a system-level portion of the input sequence for the content generation model, and an evaluation process using a RQO may later scan the content element definition for violations of the "prohibited_terms" list or other style constraints and may recommend automatic revisions when violations occur.

In some embodiments, the classification control subsystem 125 may operate on taxonomy reusable objects that encode complete learning framework definitions as structured classification data. A taxonomy reusable object may include a taxonomy type identifier that indicates a particular classification system, such as a Bloom's taxonomy, a depth-of-knowledge taxonomy, or a competency framework. A taxonomy reusable object may further include a number of levels in the classification system and a plurality of level definitions. Each level definition may specify a level identifier, a level name, and a textual description. Each level definition may also specify one or more sets of permitted linguistic or structural features, such as example verbs, example objectives, example tasks, example questions, and exemplar assessment methods. In addition, each level definition may include cognitive process descriptors, typical time multipliers, common error patterns, and relationships to other levels, such as prerequisite levels or relative complexity descriptions. The classification control subsystem 125 may select a taxonomy reusable object based on associations between specification items and taxonomy identifiers. The classification control subsystem 125 may also identify one or more levels within the taxonomy that correspond to a subset of specification items aligned to a target content element. Furthermore, the classification control subsystem 125 and the prompt assembly subsystem 126 may constrain the content generation model by including, in the input sequence, the permitted verbs and patterns from the level definitions corresponding to the aligned specification items. The classification control subsystem 125 and the prompt assembly subsystem 126 may later validate generated content against the same level definitions.

In some embodiments, the prompt assembly subsystem 126 may embed, into the input sequence, an explicit list of permitted verbs and linguistic patterns obtained from the level definition identified by the classification control subsystem 125. The prompt assembly subsystem 126 may further include instructions directing the content generation model to select verbs or other words only from this list when constructing the specification items. By constraining the content generation model to a whitelist of words (e.g., verbs) associated with the target classification level, the system 100 may reduce the likelihood that the content generation model produces verbs or linguistic patterns that are inconsistent with the intended classification.

In some embodiments, after the content generation subsystem 127 receives output from the content generation model, the system 100 may parse generated specification items to extract key verbs or structural cues. The system 100 may compare the extracted key verbs or structural cues against the permitted verbs and patterns for the relevant classification level in the taxonomy reusable object. If the extracted features do not appear in the permitted sets, the system 100 may treat the situation as a classification inconsistency and may flag the affected specification items. The system 100 may either request a revised specification from the content generation model or provide feedback via a RQO. For example, in a domain where a taxonomy level is intended to represent basic recall behaviors, the taxonomy reusable object may list verbs corresponding to recall-level behaviors. The system 100 may instruct the content generation model to use only those verbs and may reject outputs that instead use verbs associated with more complex levels. In addition, the system 100 may update one or more configuration parameters in the taxonomy reusable object based on repeated classification inconsistencies, thereby refining the permitted verbs and patterns over time.

In some embodiments, the plurality of reusable objects further includes time estimation reusable objects that specify configurable rules for calculating time-on-task values for content elements without modifying executable code. A time estimation reusable object may include a structure that includes a field indicating a target learner population's educational levels, such as high school learners, undergraduate learners, graduate learners, or professional learners, and a plurality of content-type-specific rule sets. For each content type, such as reading, writing, quiz or exam items, media viewing, simulations, laboratory activities, or projects, the time estimation reusable object may store structured fields describing parameters and lookup tables. For reading activities, the time estimation reusable object may specify a "base_words_per_minute" parameter, "density_levels" that categorize how many new concepts are introduced, "depth_levels" that indicate whether learners should skim, read, engage, or read deeply, and a "lookup table" that maps combinations of density and depth to minutes-per-500-words or another normalized unit. For writing activities, the time estimation reusable object may specify parameters such as an amount of writing, a drafting level that distinguishes no drafting, limited drafting, and extensive drafting, or writing type categories such as reflection, narrative, argument, or research, along with a table of multipliers that convert these parameters into estimated minutes. For quiz and exam content, the time estimation reusable object may specify per-question estimates for different item types and may apply an additional multiplier for high-stakes assessments.

In some embodiments, the plurality of reusable objects further includes time estimation reusable objects that specify configurable rules for calculating time-on-task values for content elements without modifying executable code. A time estimation reusable object may include a structure that includes a field indicating a target learner population's educational levels, such as high school learners, undergraduate learners, graduate learners, or professional learners. In addition, the structure may include a plurality of content-type-specific rule sets. For each content type, such as reading, writing, quiz items, exam items, media viewing, simulations, laboratory activities, or projects, the time estimation reusable object may store structured fields describing parameters and lookup tables. For reading activities, the time estimation reusable object may specify a "base_words_per_minute" parameter and "density_levels" that categorize how many new concepts are introduced. The time estimation reusable object may also specify "depth_levels" that indicate whether learners should skim, read, engage, or read deeply. Moreover, the time estimation reusable object may specify a "lookup table" that maps combinations of density and depth to minutes-per-500-words or another normalized unit. For writing activities, the time estimation reusable object may specify parameters such as an amount of writing and a drafting level that distinguishes no drafting, limited drafting, and extensive drafting. The time estimation reusable object may also specify writing type categories such as reflection, narrative, argument, or research. In addition, the time estimation reusable object may specify a table of multipliers that convert these parameters into estimated minutes. For quiz and exam content, the time estimation reusable object may specify per-question estimates for different item types and may apply an additional multiplier for high-stakes assessments.

In some embodiments, a time estimation reusable object may specify representation-specific factors that account for different display formats within a content type. For reading activities, the time estimation reusable object may distinguish between a "reading_display_format" field having values such as paragraph, table, or infographic. In addition, the time estimation reusable object may associate each display format with a distinct multiplier in a lookup table. The lookup table may reflect that tabular data or dense visual diagrams may require more processing time than narrative paragraphs of equivalent word count. For media activities, the time estimation reusable object may specify a "media_type" field and a "media_complexity" field. The "media_complexity" field may include values such as simple illustrative image, detailed infographic, or narrated video. Furthermore, the time estimation reusable object may assign different base durations or multipliers for each combination. The system 100 may use these representation-specific multipliers, in addition to density and depth parameters, when computing time-on-task values from content element metadata. As a result, the system 100 may produce more accurate estimates for activities that rely on non-paragraph formats and complex visuals.

In some embodiments, each level definition within a taxonomy reusable object may include additional structured fields beyond example verbs and objectives. A level definition may specify one or more "assessment_methods" that describe typical assessment formats appropriate for a classification level. The typical assessment formats may include multiple-choice questions, short-answer questions, labeling tasks, performance tasks, or project-based assessments. The level definition may further include a typical_time_multiplier that describes relative time-on-task expectations for activities at that level compared to a baseline level. In addition, the level definition may include a "common_errors" field that enumerates frequent misalignments that occur when designers attempt to implement the level. The frequent misalignments may include using comprehension-level verbs in place of recall-level verbs or asking learners to analyze content when only memorization is required. The level definition may also include a "relationship_to_other_levels" structure that describes prerequisite relationships, such as which levels are expected to precede the current level. Moreover, the level definition may include a relative complexity description that compares the level's difficulty to adjacent levels. The classification control subsystem 125 may use these additional fields to provide the prompt assembly subsystem 126 with richer classification constraints. The richer classification constraints may specify allowed verbs and patterns and may contextualize cognitive complexity, assessment formats, and typical mistakes for the content generation model.

In some embodiments, the system 100 may use the additional fields of a taxonomy reusable object during validation of generated content element definitions. After a content element definition is generated for a target content element aligned to specification items associated with one or more taxonomy levels, the system 100 may parse features of the content element definition such as the verbs used in learning objectives, the types of tasks specified, and the structure of assessment items. The system 100 may compare these features to the sets of permitted linguistic features, "assessment_methods", and relative complexity descriptors associated with the relevant taxonomy levels in the taxonomy reusable object. If the content element definition's features fall outside the permitted sets or correspond to common error patterns listed in the "common_errors" field, the system 100 may produce validation results indicating that the content element definition is inconsistent with the target taxonomy level and may instruct a content generation model, via an evaluation reusable object, to generate recommendations or perform revisions. The system 100 may store validation results and associated taxonomy-level information with the content element definition for later reporting or quality analysis.

In some embodiments, the classification control subsystem 125 and an evaluation subsystem may further use common error patterns and inter-level relationship data from the taxonomy reusable object to characterize and explain classification inconsistencies. A level definition within a taxonomy reusable object may include a "common_errors" field that lists patterns of misuse. For example, the "common_errors" field may list frequent use of comprehension-level verbs in objectives intended for a recall level. In addition, the level definition may include a "relationship_to_other_levels" structure that specifies prerequisite levels and relative complexity differences between levels. When the system 100 parses verbs or structural cues from a content element definition and determines that these features correspond to a taxonomy level that differs from a target level associated with aligned specification items, the system 100 may consult the "common errors" field and the "relationship_to_other_levels" structure. The system 100 may determine whether the features match a known error pattern. Furthermore, the system 100 may determine how many levels the features deviate from the target level. The system 100 may then populate reasoning fields and recommended changes in a RQO evaluation result with information. The information may indicate, for example, that an activity requires only recall when the aligned specification item targets analysis. Moreover, the information may indicate that the activity should be revised to require comparison, categorization, or other analyze-level behaviors.

In some embodiments, personality reusable objects and taxonomy reusable objects may each include explicit prohibited-term lists or pattern constraints. The system 100 may use the prohibited-term lists or pattern constraints both during prompt assembly and during evaluation. When constructing an input sequence for a content generation model, the prompt assembly subsystem 126 may include instructions derived from these reusable objects. The instructions may direct the content generation model not to use specific verbs, phrases, or stylistic features. For example, the instructions may direct the content generation model to avoid the verb "understand" in learning objectives. Alternatively, the instructions may direct the content generation model to avoid terms that conflict with accessibility guidelines or inclusive language policies. After content generation, the evaluation subsystem or the system 100 may apply RQOs that reference the same prohibited-term lists and pattern constraints. The evaluation subsystem or the system 100 may detect violations by scanning the content element definition for prohibited tokens or structures. If violations are detected, the system 100 may record evaluation results. In addition, the system 100 may block publication or workflow progression for the content element definition. Furthermore, the system 100 may initiate a revision process that instructs a content generation model to replace disallowed terms with allowed terms. The allowed terms may be specified in the personality reusable object or taxonomy reusable object.

In some embodiments, the system 100 may select a time estimation reusable object for a program based on program-level configuration parameters. The program-level configuration parameters may include whether the program follows a "Carnegie Unit" framework, a semester credit hour framework, or a competency-based framework. When a user or workflow requests a time estimate for a target content element definition, the system 100 may extract metadata from the content element definition. The metadata may include word counts, numbers and types of questions, density and depth indicators, and stakes. The system 100 may identify the content type. In addition, the system 100 may apply the rules encoded in the selected time estimation reusable object. The prompt assembly subsystem 126 may assemble a calculation input that includes the relevant fields from the time estimation reusable object's lookup tables and formulas. Furthermore, the prompt assembly subsystem 126 may optionally transmit that input to a content generation model to obtain a detailed analysis and step-by-step justification. The system 100 may compute an estimated time-on-task value for the content element definition. Moreover, the system 100 may store the computed time-on-task value in association with the content element definition. As a result, module-level, course-level, and program-level aggregations can be computed by summing time-on-task values across descendant content elements. The system 100 may use these aggregated values in accreditation and compliance reports that compare actual time totals against required hour thresholds defined in program-level requirements.

The content generation subsystem 127 may manage interaction with the content generation model to obtain a content element definition. The content generation subsystem 127 may transmit the assembled input sequence to the content generation model. In addition, the content generation subsystem 127 may receive a resultant content element definition for the target content element. For example, the content generation subsystem 127 may send the prompt sequence to a large language model endpoint. The content generation subsystem 127 may receive a structured definition of quiz items that each reference the linked learning objectives and use Apply-level verbs from the candidate classification object. The content generation subsystem 127 may then cause storage of the content element definition in association with the subset of the specification items that is linked to the target content element by the alignment relationships. As a result, the content generation subsystem 127 may maintain traceability between the generated content and the specification items.

In some embodiments, the hierarchy management subsystem 123 and the prompt assembly subsystem 126 may operate on a plurality of reusable object types that share a unified object schema. The system 100 may represent each reusable object as a structured record that includes identification data. The identification data may include an object identifier, a human-readable name, a type indicator, a category, and an origin level within the hierarchical data model. The system 100 may further store access-control metadata for each reusable object. The access-control metadata may include one or more tenant or organization identifiers and permission metadata that indicates which user roles may view, use, or edit the reusable object. Each reusable object may include descriptive content. The descriptive content may include a description field, a directions field that stores step-by-step procedural instructions, a template field that stores a parameterized pattern, and an example field that stores a sample implementation of the pattern. The system 100 may associate versioning and lifecycle metadata with each reusable object. The versioning and lifecycle metadata may include creation timestamps, modification timestamps, a version identifier, and a status indicator. In some implementations, the system 100 may implement multiple reusable object types within the unified schema. The reusable object types may include RDOs that provide structural patterns for content elements, RBOs that specify platform-specific implementation templates, RQOs that encode evaluation criteria, personality or voice reusable objects that define writing style constraints, taxonomy reusable objects that store structured classification systems, time estimation reusable objects that store calculation methods, and program planning reusable objects that encode reusable planning patterns.

In some embodiments, when a user edits a reusable object, the system 100 may create a new version entry rather than overwriting the existing reusable object definition. The system 100 may assign a new version identifier while preserving prior versions in the repository. As a result, historical definitions remain available. Each content element definition generated by the content generation subsystem 127 may record the identifiers of the reusable objects used during generation. In addition, each content element definition may record the corresponding version identifiers. As a result, the system 100 may reproduce the exact context under which a content element definition was created. Furthermore, the system 100 may distinguish content generated with earlier versions of a reusable object from content generated with later versions.

In some embodiments, the system 100 may support administrative workflows for deprecating and migrating reusable object versions. When an administrator marks a reusable object version as deprecated, the system 100 may query the content repositories. The system 100 may identify content element definitions whose metadata reference the deprecated version identifier. In addition, the system 100 may generate reports listing those content element definitions and their locations in the hierarchical data model. In some implementations, the system 100 may initiate regeneration workflows. In these workflows, the content generation subsystem 127 constructs new input sequences that substitute a newer version of the reusable object while preserving other context. Moreover, the content generation subsystem 127 obtains revised content element definitions and updates stored records after optional review. Domain-specific parameters, such as specific terminology or program rules, may differ between versions. These parameters may be treated as part of the data stored in the reusable object rather than as part of the underlying versioning mechanism.

In some embodiments, the plurality of reusable objects further includes a reusable program planning object (RPPO). These objects encode reusable analysis and planning patterns for designing hierarchical structures before individual content elements are created. A RPPO may include identification data similar to other reusable objects. The identification data may include an object identifier, a name, and a type indicator specifying that the object is a program planning object. Furthermore, the identification data may include a category and an origin level such as an organization level or a program level. The RPPO may further include descriptive content such as a description field that indicates a planning use case. In addition, the RPPO may include a directions field that stores step-by-step procedural instructions for defining program structures. Moreover, the RPPO may include a template field that stores a parameterized program map or planning artifact with placeholders. These placeholders may include program outcomes, course identifiers, credit-hour allocations, and classification level distributions. The RPPO may also include an example field that stores a sample program plan. Furthermore, the RPPO may include metadata fields such as a planning_stage indicator that distinguishes initial program design from revision workflows. The RPPO may also include an accreditation_constraints field that stores references to accreditation rules or credit requirements. In addition, the RPPO may include a program_scope field that specifies applicable credential types such as high school pathways, undergraduate degrees, graduate degrees, or workforce-certification programs.

In some embodiments, the system 100 may treat outputs generated by RPPOs as program-level requirements. These requirements influence selection and locking of other reusable objects in the hierarchical data model. For example, a program planning object may generate a program planning artifact. The program planning artifact may specify a target distribution of taxonomy levels across courses in a program. In addition, the program planning artifact may specify a minimum number of activities of particular types per module and required credit-hour allocations per course. The system 100 may store these planning artifacts in association with the program level in the hierarchical data model. Furthermore, the system 100 may cause the hierarchy management subsystem 123 to use the artifacts when determining the subset of reusable objects available at the program and course levels. The hierarchy management subsystem 123 may mark certain RDOs as locked objects that must be available for use in all courses. The marking may be based on the stored program-level requirements. In addition, the hierarchy management subsystem 123 may select one taxonomy reusable object and one time estimation reusable object as program defaults. Moreover, the hierarchy management subsystem 123 may prevent selection of RDOs or RQOs that conflict with the planning constraints. As a result, RPPOs may indirectly control which RDOs, taxonomy reusable objects, and time estimation reusable objects are selected and enforced for a program.

In some embodiments, when a user initiates a program planning workflow at a program level in the hierarchical data model, the hierarchy management subsystem 123 may determine a subset of RPPOs available for the program level. The hierarchy management subsystem 123 may base the determination on inheritance metadata and tenant identifiers. The prompt assembly subsystem 126 may select one or more RPPOs from the subset. In addition, the prompt assembly subsystem 126 may assemble a planning input sequence for a content generation model. The planning input sequence may include organization-level context, accreditation parameters, and the selected RPPOs. The content generation model may return proposed program-level artifacts such as outcome maps, recommended distributions of classification levels across courses, suggested credit-hour allocations, or structured program planning reports. The system 100 may store the generated artifacts as program-level records associated with the program-level entity in the hierarchical data model. Furthermore, the system 100 may subsequently use fields from the program-level records as program requirements or constraints when the prompt assembly subsystem 126 constructs input sequences for course-level and activity-level content element definitions. In this way, a RPPO may enable consistent, reusable planning behavior influencing downstream design and build operations without requiring manual re-specification of program-level strategies for each new program.

In some embodiments, reusable objects may include at least RDOs, RBOs, RQOs, personality reusable objects, taxonomy reusable objects, time estimation reusable objects, and RPPOs. The system 100 may represent each reusable object using a common core schema including identification data. The identification data may include an object identifier, a human-readable name, a type indicator indicating a reusable object type, a category field, and an origin level field. The origin level field may specify a level of the hierarchical data model at which the reusable object originates. The system 100 may further store access-control metadata for each reusable object. The access-control metadata may include a tenant or organization identifier, optional program and course identifiers, and permission metadata. The permission metadata may indicate which user roles may view, use, or edit the reusable object at which levels of the hierarchical data model. Each reusable object may include descriptive content. The descriptive content may include a description field explaining an intended use of the reusable object. In addition, the descriptive content may include a directions field storing step-by-step procedural instructions, a template field storing a parameterized pattern with placeholders for context variables, and an example field storing a sample implementation of the pattern. The system 100 may associate versioning and lifecycle metadata with each reusable object. The versioning and lifecycle metadata may include creation timestamps, modification timestamps, a version identifier, and a status indicator such as Active, Draft, or Archived. As a result, the hierarchy management subsystem 123 and the prompt assembly subsystem 126 can operate on reusable objects consistently regardless of reusable object type.

For example, in some embodiments, when a user selects a RDO in a design interface, UI components associated with a computer system may read structured fields such as a "provide_essential_information" field and a "required_elements" field from the selected RDO. The UI components may dynamically generate input controls corresponding to these fields and may mark those controls as required for the target content element. The computer system 100 may prevent a user from submitting a generation request or saving a content element definition until all required controls are populated, thereby enforcing that essential contextual information and required structural components are specified before the content generation subsystem 127 is invoked. In this way, the RDO's metadata directly influences the composition and validation behavior of the UI without requiring domain-specific hard-coding.

In some embodiments, UI components associated with the system 100 may further use style and terminology constraints from personality reusable objects and taxonomy reusable objects to analyze draft content entered or generated in the interface. The system 100 may retrieve one or more prohibited-term lists or pattern constraints from active personality reusable objects and classification reusable objects and may scan visible text for occurrences of those terms or patterns. When the system 100 detects a violation, the UI may highlight the offending segments and display explanatory messages. The UI may also present an option for automatic revision, which, when selected, may cause the prompt assembly subsystem 126 to construct a revision input that includes the offending content, the relevant reusable objects, and instructions to replace or rephrase the content in accordance with the style and classification constraints. Although specific prohibited terms or patterns may vary across domains or organizations, the interaction pattern of highlighting violations and offering automated revision based on reusable object metadata remains the same.

Figure 2:
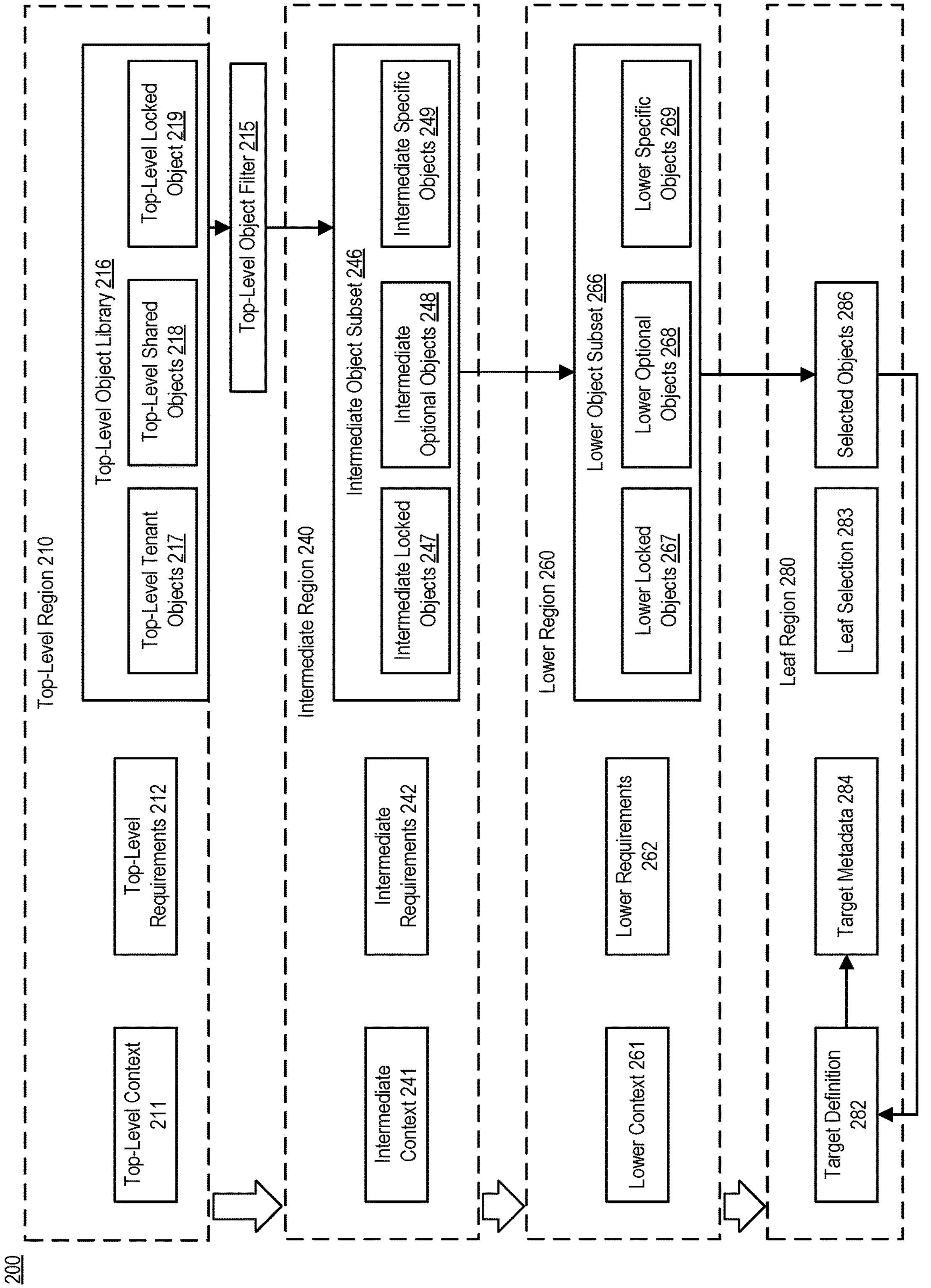
FIG. 2 shows an example hierarchical inheritance diagram for reusable objects in a multi-level data model, in accordance with one or more embodiments.

FIG. 2 shows an example hierarchical inheritance diagram 200 for reusable objects in a multi-level data model, in accordance with one or more embodiments. The hierarchical inheritance diagram 200 illustrates how a system determines, based on inheritance metadata for a plurality of reusable objects associated with a first level of a hierarchical data model, a subset of reusable objects available for use at a second level. In addition, the hierarchical inheritance diagram 200 illustrates how the subset of reusable objects can be used when assembling an input sequence for a content generation model.

A top-level region 210 represents a first scope or first level of a hierarchical data model. The top-level region 210 includes a top-level context 211 storing configuration or descriptive data for the first scope. Furthermore, the top-level region 210 includes a top-level requirements 212 storing policies or constraints applying to descendant scopes. A top-level object library 216 stores a plurality of reusable objects associated with the top-level region 210. The top-level object library 216 includes top-level tenant objects 217 associated with a specific tenant or computing context. In addition, the top-level object library 216 includes top-level shared objects 218 available across multiple tenants or contexts. Moreover, the top-level object library 216 includes a top-level locked object 219 marked as mandatory for descendant levels by inheritance metadata. A top-level object filter 215 receives the reusable objects stored in the top-level object library 216. The top-level object filter 215 produces a filtered set of reusable objects based on one or more parameters such as tenant identifiers while preserving the top-level shared objects 218 and the top-level locked object 219.

An intermediate region 240 represents a descendant level of the top-level region 210, such as a second scope in the hierarchical data model. The intermediate region 240 includes an intermediate context 241 storing metadata specific to the intermediate region 240. Furthermore, the intermediate region 240 includes an intermediate requirements 242 storing rules, preferences, or additional policies for that level. An intermediate object subset 246 stores a subset of the plurality of reusable objects available for use at the intermediate region 240. The intermediate object subset 246 is determined by applying inheritance metadata and the output of the top-level object filter 215 to the top-level object library 216. The intermediate object subset 246 includes intermediate locked objects 247 corresponding to inherited reusable objects with lock flags set. In addition, the intermediate object subset 246 includes intermediate optional objects 248 that may or may not be selected at lower levels. Moreover, the intermediate object subset 246 includes intermediate specific objects 249 defined directly at the intermediate region 240.

A lower region 260 represents a second level in which a subset of reusable objects is available for use based on inheritance from the intermediate region 240. The lower region 260 includes a lower context 261 storing metadata for the lower region 260. Furthermore, the lower region 260 includes a lower requirements 262 storing constraints or configuration rules for content elements generated at or below the lower region 260. A lower object subset 266 represents a subset of reusable objects available for use at the lower region 260 and at descendant leaf levels. The lower object subset 266 is determined based on inheritance metadata associated with the intermediate object subset 246. The lower object subset 266 includes lower locked objects 267 reflecting mandatory objects inherited from the intermediate locked objects 247. In addition, the lower object subset 266 includes lower optional objects 268 selected from the intermediate optional objects 248 in view of the lower requirements 262. Moreover, the lower object subset 266 includes lower specific objects 269 created directly at the lower region 260.

A leaf region 280 may represent a leaf level of the hierarchical data model in which a target content element is defined. A target definition 282 may store a content element definition for a target content element generated by a content generation model. A target metadata 284 may store metadata associated with the target definition 282. The metadata may include indications of alignment relationships between the target content element and specification items in a list alignment data structure. In addition, the metadata may include classification-level metadata and evaluation metrics. Selected objects 286 may represent a set of reusable objects chosen from the lower object subset 266 for use with the target content element. The set may include at least one reusable object that supplies structural or behavioral guidance. Furthermore, the set may include at least one classification object that includes structured classification data.

In some embodiments, a computer system may automatically determine one or more selected objects for a target content element at the leaf region based on metadata associated with the target content element. The metadata may include an activity type or a module structure element. For example, the computer system may store metadata fields in RDOs that indicate supported activity types and module structure elements. The supported types and elements may include "discussion," "research," "practice," or "assessment." When a user creates a new target content element and specifies an activity type of "research" and a module structure element corresponding to a research or exploration phase, the computer system may identify one or more RDOs in the lower object subset 266. The computer system may identify RDOs whose supported activity types and module elements include the specified values. The computer system may then automatically select a default RDO for the target content element from the compatible set. Furthermore, the computer system may include the selected RDO in the selected objects 286 for the leaf region. As a result, the computer system may reduce manual configuration and may ensure that the structured directions and templates associated with the RDO consistently guide creation of all target content elements of that activity type.

In some embodiments, a RDO may further include structured constraint fields that specify required structural components and alignment conditions for content elements generated using the RDO. For example, a RDO may include a required_elements field that stores a list of section labels or structural components that must appear in a content element definition generated from the RDO. The required components may include a research task section, a synthesis component, and a reflection segment. The RDO may include an alignment_requirements field that stores one or more alignment rules. The alignment rules may require that the content element definition be linked to at least a minimum number of specification items in the list alignment data structure. Alternatively, the alignment rules may require that the content element definition reference at least one program outcome and one skill descriptor. The RDO may also include a provide_essential_information field that enumerates context variables that a computer system may use for assembling an input sequence for a content generation model. The context variables may include a topic description, a target learner group, and identifiers of aligned specification items. A computer system may enforce these constraint fields by preventing submission of a generation request until the provide_essential_information items are supplied. Moreover, the computer system may validate that required_elements and alignment_requirements are satisfied before allowing a content element definition to proceed to later workflow stages.

In some embodiments, the hierarchical data model may include a plurality of levels, such as a first level, a second level, a third level, and a fourth level. A computer system may apply inheritance metadata and permission metadata to determine which reusable objects are available at each level. In applying inheritance metadata and permission metadata, the computer system may determine a subset of reusable objects available at each level by applying a filtered plurality of reusable objects, which excludes objects outside tenant scope and respects lock flags.

The computer system may store, for each reusable object, an origin level, one or more target levels to which the reusable object may inherit, a lock flag indicating whether the reusable object is mandatory at allowed descendant levels, and identifiers for owning entities such as a tenant or an entity associated with a level of the hierarchical data model. For example, a computer system may compute a subset of reusable objects for a second level. The computer system may filter the plurality of reusable objects by tenant or entity identifiers. In addition, the computer system may include all reusable objects whose origin level and inheritance attributes permit use at the second level. Furthermore, the computer system may designate inherited objects as locked or optional based on the lock flag. The computer system may allow administrators operating at a first level to create and edit reusable objects whose origin level is the first level. Alternatively, the computer system may allow administrators operating at a second level to select first-level reusable objects for use at the second level and to create reusable objects specific to the second level. Moreover, the computer system may allow users operating at a third level to select optional reusable objects permitted by the second level and to create reusable objects specific to the third level. The computer system may prevent modification of locked reusable objects at lower levels. Operations at a fourth level may select among reusable objects available at the third level but may not create or edit reusable objects. By applying inheritance and permission metadata in combination, the computer system may enforce that required reusable objects propagate from higher levels. Simultaneously, the computer system may allow lower levels to refine and extend the reusable object set without violating locked requirements from higher levels.

In some embodiments, a computer system may associate distinct capabilities with each level of the hierarchical data model and with user roles that operate at those levels. For example, in an educational programming domain, the hierarchical data model may include an organization level, a program level, a course level, and an activity level as shown in FIG. 2. At the organization level (corresponding to the top-level region 210), organization-level administrators may create, edit, and archive reusable objects whose origin level is the organization level. The reusable objects may include design objects, build objects, quality objects, personality objects, taxonomy objects, time estimation objects, and program planning objects. Organization-level administrators may also mark certain organization-level reusable objects as shared across multiple tenants. In addition, organization-level administrators may set lock flags that indicate that particular objects are mandatory for descendant levels. At the program level (corresponding to the intermediate region 240), program-level administrators may view organization-level reusable objects that are available to their organization. Furthermore, program-level administrators may select subsets of organization-level reusable objects to be used by a program. Program-level administrators may set inheritance metadata such as lock flags that determine which objects are required for all courses in the program. Moreover, program-level administrators may create program-specific reusable objects that originate at the program level and are available only within that program.

Continuing the educational programming example, at the course level (corresponding to the lower region 260), course-level designers may view all locked reusable objects inherited from higher levels. Course-level designers may also view all optional reusable objects that the program-level administrators have made available to courses in the program. Course-level designers may select optional reusable objects for use in a particular course. In addition, course-level designers may create course-level reusable objects for specialized needs that are not covered by organization-level or program-level reusable objects. Course-level designers cannot modify inheritance metadata or content of locked reusable objects. The computer system may reject attempted modifications based on permission metadata associated with those objects. At the activity level (corresponding to the leaf region 280), users may select among reusable objects that have been made available to the course. For example, users may select a design object corresponding to a particular activity type or a personality object for a specific content element. Activity-level users may not create new reusable objects or edit existing reusable objects. Activity-level operations therefore operate on a constrained subset of reusable objects determined by inheritance metadata, lock flags, and role-based permission metadata. A computer system may enforce these constraints by filtering available objects and disabling editing capabilities at the activity level.

In some embodiments, the information depicted by hierarchical inheritance diagram 200 may be used by the a computer system to determine which reusable objects are included in the lower object subset 266. The determination may be based on inheritance metadata for the plurality of reusable objects stored in the top-level object library 216 and the intermediate object subset 246. The lower object subset 266 represents the subset of reusable objects that is available for use at the lower region 260. The lower object subset 266 may provide hierarchical context for the target content element. The selected objects 286 may include a classification object that is associated with a subset of specification items identified in the target metadata 284. The association may be based on alignment relationships between generated content elements and the specification items in the list alignment data structure. The classification object in the selected objects 286 may contain structured classification data indicating a set of terms. The set of terms may be associated with a classification level that is associated with the subset of specification items.

In some embodiments, a computer system may use reusable program planning objects (RPPOs) that encode reusable analysis and planning patterns for designing hierarchical structures before individual content elements are created. A RPPO may include directions for defining higher-level requirements. In addition, the RPPO may include recommended distributions of classification levels across entities at intermediate levels. Furthermore, the RPPO may include preferred patterns of content element types and constraints derived from external requirements or organizational policies. The RPPO may further include templates for planning reports, example planning maps, and metadata that indicates applicable domains or types. When a user initiates a planning workflow at an intermediate level in the hierarchical data model, the computer system may select one or more RPPOs associated with the organization or tenant. The computer system may assemble a planning input sequence that includes organizational context and constraint parameters. Moreover, the computer system may request from a content generation model a proposed structure or planning report. The computer system may store the generated planning artifacts. The computer system may use the resulting higher-level requirements as context for later assembly of input sequences for content element definitions at lower levels.

In some embodiments, when assembling an input sequence for a content generation model to generate the content element definition stored in the target definition 282, a computer system may obtain hierarchical context. The hierarchical context may be derived from the lower context 261, the lower requirements 262, and the lower object subset 266. The computer system may select a reusable object from the lower object subset 266. In addition, the computer system may insert the classification object from the selected objects 286 into the input sequence. A portion of the structured classification data contained in the classification object may correspond to a classification level. Furthermore, the portion may constrain the content generation model to use the set of terms associated with that classification level when generating the content element definition. After the content element definition is obtained from the content generation model and stored in the target definition 282, the computer system may update the target metadata 284. The computer system may store associations between the content element definition and the subset of specification items that is aligned to the target content element.

In some embodiments, a computer system may implement role-based access control rules that define permitted operations on reusable objects for different user roles at different levels of the hierarchical data model. A first administrator role operating at a first level may be permitted to create, edit, and archive reusable objects whose origin level is the first level. In addition, the first administrator role may be permitted to designate certain first-level reusable objects as shared across tenants. Furthermore, the first administrator role may be permitted to set lock flags that indicate that those reusable objects are mandatory at descendant levels. The first administrator role may be prevented from editing reusable objects originating at lower levels. A second administrator role operating at a second level may be permitted to view first-level reusable objects available to entities at the second level. Moreover, the second administrator role may be permitted to select subsets of first-level reusable objects for use at the second level. The second administrator role may be permitted to mark selected reusable objects as locked at the second level. Alternatively, the second administrator role may be permitted to create and edit reusable objects originating at the second level. The second administrator role may be prevented from modifying first-level base objects. A designer role operating at a third level may be permitted to view locked and optional reusable objects that propagate to the third level. In addition, the designer role may be permitted to select optional reusable objects for use within an entity at the third level. Furthermore, the designer role may be permitted to create reusable objects that originate at the third level. The designer role may be prevented from modifying reusable objects that originate at higher levels or changing lock flags. A user role operating at a fourth level may be permitted to select among reusable objects that are available to an entity at the third level for a specific target content element. For example, a user at the fourth level may select a personality reusable object or a RDO. The user role at the fourth level may be prevented from creating or editing reusable objects. The computer system may enforce these rules by checking role identifiers, origin level, and permission metadata before applying requested changes to reusable objects.

As an example of the operations described above in an educational programming domain where the hierarchical data model includes an organization level (top-level region 210 of FIG. 2), a program level (intermediate region 240 of FIG. 2), a course level (lower region 260 of FIG. 2), and an activity level (leaf region 280 of FIG. 2), an organization-level administrator may use a computer system to create a library of organization-level RDOs that encode general activity patterns. Such general activity patterns may include information such as case study analysis, discussion, and quantitative practice. In addition, the library may include organization-level personality reusable objects that define a general academic tone and organization-level taxonomy reusable objects that encode a cognitive taxonomy. A program-level administrator for a graduate business program may then select a subset of these organization-level RDOs and personality reusable objects for use in the program. Furthermore, the program-level administrator may use a RPPO to generate a program-level planning artifact. The program-level planning artifact may indicate that all courses in the program should include a core set of case analysis and quantitative practice activities aligned to higher-order cognitive levels.

Continuing the example, the computer system may store the program-level planning artifact. The computer system may mark a core case analysis and quantitative practice RDOs as being locked at the program level. In addition, the computer system may configure the business program to use a particular taxonomy reusable object for cognitive levels. Furthermore, the computer system may select a time estimation reusable object appropriate for graduate-level semester credits. When course-level designers create courses within the graduate business program, they may automatically inherit the locked RDOs, personality reusable objects, taxonomy reusable object, and time estimation reusable object. Moreover, course-level designers may optionally select additional RDOs that are specific to individual courses. For each activity-level content element definition that a course-level designer creates, the computer system may then assemble input sequences for a content generation model using the inherited personality reusable object. The computer system may also use a selected RDO, the selected taxonomy reusable object, and aligned specification items from a list alignment data structure. RQOs configured at the program level may subsequently evaluate the generated content element definitions for alignment and pedagogical quality. In addition, time estimation reusable objects may compute per-activity and per-course time-on-task values for accreditation reporting.

Figure 3:
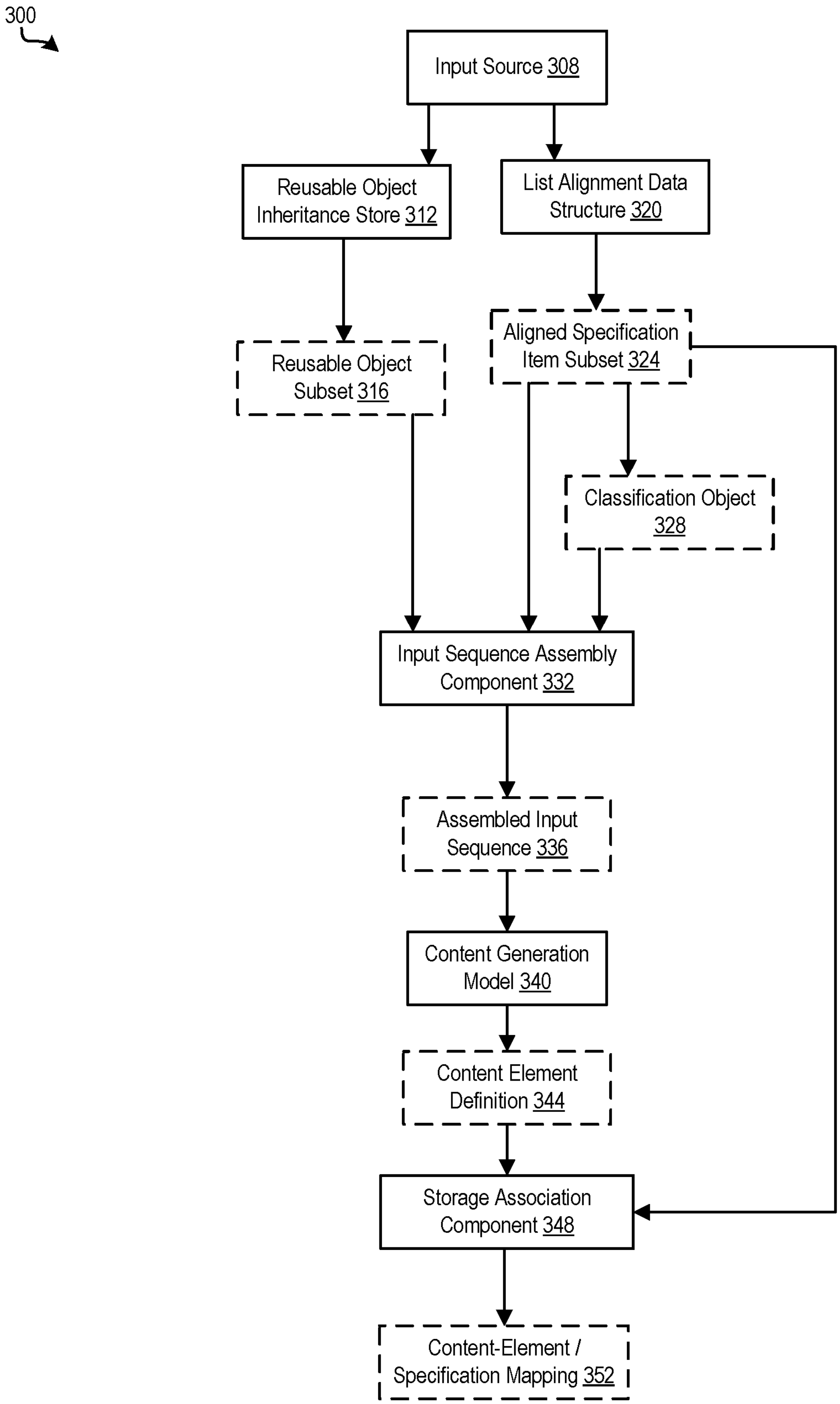
FIG. 3 shows an example flow diagram for assembling a model input sequence and generating a content element definition based on hierarchical reusable objects, alignment relationships, and a classification object in accordance with one or more embodiments.

FIG. 3 shows an example flow diagram 300 depicting operations for assembling a model input sequence and generating a content element definition based on hierarchical reusable objects, alignment relationships, and a classification object in accordance with one or more embodiments. The flow diagram 300 depicts operations that a computer system may perform for determining a subset of reusable objects available at a second level of a hierarchical data model. In addition, the flow diagram 300 depicts operations for identifying specification items aligned to a target content element. Furthermore, the flow diagram 300 depicts operations for constraining a content generation model with classification data. Moreover, the flow diagram 300 depicts operations for storing a generated content element definition in association with aligned specification items in a coordinated sequence of operations.

An input source 308 may provide an indication of a target content element and a generation request for that target content element. The input source 308 may include a design interface, a workflow engine, or another component that supplies identifiers for the target content element. The input source 308 may also supply a position of the target content element within a hierarchical data model. The input source 308 may enable the computer system to associate the generation request with a specific second level in the hierarchical data model. For example, the input source 308 may provide a course activity identifier and indicate that the activity is at a course level beneath a program level.

A reusable object inheritance store 312 may store inheritance metadata and definitions for a plurality of reusable objects associated with a first level of the hierarchical data model. The reusable object inheritance store 312 may include fields that specify applicability of each reusable object to downstream levels. In addition, the reusable object inheritance store 312 may include fields specifying tenant constraints, lock flags, and priority values. The reusable object inheritance store 312 may allow the computer system to determine, for a given second level, which reusable objects are available for use. The determination may be based on the inheritance metadata. For example, the reusable object inheritance store 312 may contain twenty organization-level design objects with metadata indicating which programs may inherit each design object.

A reusable object subset 316 may represent a subset of reusable objects determined to be available for use at the second level. The determination may be based on the inheritance metadata stored in the reusable object inheritance store 312. The computer system may compute the reusable object subset 316 by filtering the plurality of reusable objects using inheritance criteria such as level applicability and lock status. The filtering may ensure that only reusable objects that are permitted and relevant at the second level are considered during model input assembly. For example, the reusable object subset 316 may contain five design templates that are authorized for all courses in a program at the course level.

A list alignment data structure 320 may store specification items and alignment relationships between generated content elements and the specification items. The list alignment data structure 320 may include lists of outcomes, objectives, requirements, competencies, or other specification items. In addition, the list alignment data structure 320 may include mappings that indicate which content elements are aligned to which specification items. The list alignment data structure 320 may allow the computer system to identify a subset of specification items associated with the target content element. The identification may be based on existing or requested alignment relationships. For example, the list alignment data structure 320 may indicate that a particular module activity is aligned to three learning objectives and one competency statement.

In some embodiments, the computer system may coordinate multiple reusable object types concurrently and sequentially to support complex combinations of structural patterns, style constraints, classification rules, and platform-specific behaviors. For a single target content element, the computer system may select a RDO based on an activity type. In addition, the computer system may select a personality or voice reusable object based on a program-level style configuration. Furthermore, the computer system may select a taxonomy reusable object and classification level based on aligned specification items. The computer system may combine these reusable objects with hierarchical context in a single input sequence for the content generation model. In a subsequent evaluation phase, the computer system may select one or more RQOs for alignment evaluation, pedagogical review, or accessibility review. The computer system may construct separate review input sequences that include the content element definition and the selected RQOs. In a build phase, the computer system may select a RBO based on platform parameters. The computer system may invoke the content generation model to obtain implementation code for the same content element definition.

The computer system may use metadata fields in reusable objects to limit eligible combinations and to prioritize reusable objects whose historical quality metrics exceed thresholds. The metadata fields may include supported activity types, supported module elements, compatible classification levels, and platform constraints. By using these metadata-driven selection rules, the computer system may support large libraries of reusable objects and many potential combinations while preserving consistent behavior across generated content element definitions.

In some embodiments, a computer system may apply metadata-driven selection rules to manage combinatorial complexity arising from large libraries of reusable objects. For example, an organization may define an MBA program at a program level that inherits a library of organization-level RDOs and RBOs. Program-level administrators may select and lock a subset of RDOs corresponding to core instructional patterns. The core instructional patterns may include case study analysis, business writing assignments, and quantitative practice activities. Program-level administrators may define program-specific RDOs and RQOs for discipline-specific requirements. At the course level, a Financial Management course may select additional finance-oriented RDOs and build objects. Similarly, a Marketing Strategy course may select marketing-oriented RDOs and build objects.

Although the cross-product of available RDOs, RBOs, personality reusable objects, and RQOs could theoretically produce hundreds or thousands of combinations, the computer system may apply compatibility metadata. The compatibility metadata may include supported activity types, supported module elements, compatible taxonomy levels, and platform constraints. The computer system may use the compatibility metadata to filter and prioritize a subset of combinations that are eligible for a given target content element type and course context.

In some embodiments, the computer system may treat compatibility metadata stored in reusable objects as hard constraints when assembling combinations of reusable objects for a target content element. Each reusable object may specify, in one or more metadata fields, the contexts in which the reusable object is allowed to operate. The contexts may include supported activity types, supported module structure elements, compatible taxonomy identifiers, allowed platform identifiers, and allowed content scopes. When the computer system evaluates candidate reusable objects for inclusion in an input sequence, the computer system may exclude any reusable object whose compatibility metadata conflicts with the current hierarchical context. Alternatively, the computer system may exclude any reusable object whose compatibility metadata conflicts with other reusable objects that have already been selected. The computer system may construct input sequences only from combinations of reusable objects that satisfy all stated compatibility constraints.

For example, a RBO may include compatibility metadata indicating that the RBO applies only to a particular learning platform. In addition, the compatibility metadata may indicate that the RBO applies only to content elements whose module structure element corresponds to an assessment phase. When a user requests implementation code for a content element marked as a practice activity and associated with a different platform, the computer system may automatically exclude that RBO from consideration. Similarly, a personality reusable object may indicate that the personality reusable object is applicable only to learner-facing content. The computer system may prevent that personality reusable object from being selected when generating faculty-facing review or feedback text. Although specific domains may define different activity types, module elements, or platform identifiers, the underlying mechanism of using compatibility metadata as constraints to reject invalid combinations remains consistent.

In some embodiments, a computer system may further adjust selection priorities for reusable objects based on quality metrics derived from RQO evaluations. For example, the computer system may associate each RDO with quality metrics such as average alignment scores or pedagogical quality scores. The quality metrics may be computed from evaluation results stored for content element definitions generated using that RDO. When the computer system assembles an input sequence for a content generation model, the computer system may consider only RDOs whose metadata indicate compatibility with the target activity type, module element, and taxonomy level. This prioritization adjusts the selection priority of each reusable object by increasing the likelihood of choosing objects with superior quality metrics during input sequence assembly. The computer system may further prioritize RDOs with higher quality metrics. Over time, RDOs that consistently produce higher-quality content element definitions may be selected more frequently. Alternatively, RDOs associated with lower quality metrics may be selected less frequently or may be flagged for revision by administrators. The approach may allow the computer system to manage large combinations of reusable objects while maintaining predictable quality and program-level consistency.

An aligned specification item subset 324 may represent a subset of specification items associated with the target content element as identified from the list alignment data structure 320. The computer system may obtain indications of alignment relationships between generated content elements and specification items and use those indications to form the aligned specification item subset 324. The aligned specification item subset 324 may provide a focused set of specification items that the target content element should address. For example, the aligned specification item subset 324 may include two outcome identifiers and one skill descriptor relevant to a requested practice activity.

A classification object 328 may be selected based on associations between specification items and classification objects and may include structured classification data indicating a set of terms associated with a classification level that is associated with the aligned specification item subset 324. The computer system may select the classification object 328 by examining mappings that relate specification items or groups of specification items to classification objects representing taxonomy or framework levels. This may enable the computer system to apply a consistent classification level and an associated set of terms when generating the content element definition. For example, the classification object 328 may correspond to an "Analyze" level in a taxonomy and may include structured classification data specifying permitted verbs and structural patterns for that level.

An input sequence assembly component 332 may assemble an assembled input sequence 336 for a content generation model using multiple inputs. The input sequence assembly component 332 may receive the reusable object subset 316, a selected reusable object from that subset, the aligned specification item subset 324, and the classification object 328. The input sequence assembly component 332 may derive hierarchical context from the reusable object subset 316 and the aligned specification item subset 324. Furthermore, the input sequence assembly component 332 may insert a representation of the selected reusable object into the assembled input sequence 336. Moreover, the input sequence assembly component 332 may incorporate a portion of the structured classification data from the classification object 328. The portion corresponds to the classification level associated with the aligned specification item subset 324. The portion of the structured classification data may specify a set of terms that the content generation model should use. As a result, the portion constrains how the model may express the target content element. For example, the input sequence assembly component 332 may generate the assembled input sequence 336 by concatenating organization context, program context, a course-level design template, a list of aligned objectives, and a set of taxonomy-approved verbs for the selected classification level.

The assembled input sequence 336 may represent the complete input sequence provided to a content generation model 340. The assembled input sequence 336 may encode hierarchical context derived from the reusable object subset 316 and a reusable object selected from that subset. In addition, the assembled input sequence 336 may encode the classification object 328. The encoding may include the portion of the structured classification data corresponding to the classification level. Furthermore, the encoding may include the set of terms that constrain the content generation model 340. Encoding hierarchical constraints and classification-level requirements may increase the likelihood that generated content reflects both types of constraints. For example, the assembled input sequence 336 may include instructions that require the content generation model 340 to use specific verbs and structural patterns consistent with a particular taxonomy level.

The content generation model 340 may receive the assembled input sequence 336. In response, the content generation model 340 may generate a content element definition 344 for the target content element. The content generation model 340 may process the assembled input sequence 336 according to a generative algorithm such as a language model. During processing, the content generation model 340 may use the hierarchical context, reusable object instructions, and classification constraints encoded in the sequence. The content generation model 340 may then produce reduced-error structured content element definitions or representations of the target content element. Processing the assembled input sequence 336 may allow the computer system to obtain a content element definition 344 that conforms to reusable object patterns. In addition, processing may allow the computer system to obtain a content element definition 344 that conforms to classification-level term constraints. For example, the content generation model 340 may output a detailed activity description that uses only permitted verbs from the selected classification level. Furthermore, the content generation model 340 may output a description that follows the structural template of the selected reusable object.

The content element definition 344 may represent the generated definition of the target content element. The content element definition 344 may include text, parameters, or structured fields that describe the element. The content element definition 344 may be suitable for storage within the hierarchical data model. In addition, the content element definition 344 may be suitable for association with specification items. Storage and association may provide a reusable artifact that can be referenced, revised, or evaluated. For example, the content element definition 344 may define a quiz item, an assignment prompt, or a practice activity aligned to specific outcomes.

A storage association component 348 may store the content element definition 344 in association with the aligned specification item subset 324. The storage association component 348 may write the content element definition 344 to a sub-data structure representing the target content element. Furthermore, the storage association component 348 may update mapping records that link the content element definition 344 to the specification items in the aligned specification item subset 324. Updating mapping records may preserve explicit associations between the generated content and the specification items the generated content supports. For example, the storage association component 348 may link a generated assessment description to multiple outcomes in the list alignment data structure 320.

A content-element specification mapping 352 may represent the persisted association between the content element definition 344 and the aligned specification item subset 324. The association may be stored in a data store or alignment structure. The content-element specification mapping 352 may be used by downstream reporting or validation processes. Downstream processes may verify coverage of specification items by the generated content elements. Verification may support analysis of how each specification item is addressed within a program or course. For example, the content-element specification mapping 352 may indicate that a newly generated activity satisfies three specified objectives and one competency standard.

A computer system may determine a subset of reusable objects available at a second level based on inheritance metadata. In addition, the computer system may identify specification items aligned to a target content element from a list alignment data structure. Furthermore, the computer system may select a classification object with structured classification data associated with those specification items. The computer system may also assemble an input sequence for a content generation model. The input sequence may include hierarchical context, a selected reusable object, and classification constraints. Moreover, the computer system may obtain a content element definition that uses a set of terms associated with a classification level. The computer system may then store the content element definition in association with the subset of specification items associated with the target content element.

In some embodiments, the computer system may use time estimation reusable objects to calculate expected time-on-task values or other measurements of time for generated content elements. Calculation may be configured without changing executable code. A time estimation reusable object may include an educational level parameter and a set of content-type-specific calculation rules. For example, the educational level parameter may specify a high school level, an undergraduate level, a graduate level, or a workforce training level. For reading activities, the time estimation reusable object may define factors such as base reading rates and density categories. Density categories may indicate how many new concepts are introduced. In addition, the time estimation reusable object may define reading depth categories that indicate whether learners should skim, read, or engage deeply with the content. Furthermore, the time estimation reusable object may define lookup tables that map combinations of word count, density, and depth to estimated minutes.

For example, for writing activities, a time estimation reusable object may specify parameters such as amount of writing, drafting level, and writing type. The time estimation reusable object may associate those parameters with multipliers in a computation formula. Furthermore, for quizzes or exams, the time estimation reusable object may specify per-question estimates based on question types. In addition, the time estimation reusable object may apply additional multipliers for high-stakes assessments. The computer system may select a time estimation reusable object based on program settings. Furthermore, the computer system may apply encoded rules to metadata derived from a content element definition. The computer system may aggregate time estimates across multiple content element definitions. Aggregation may compute module-level, course-level, or program-level time totals for reporting and compliance analysis.

For example, in an educational programming domain, a time estimation reusable object configured for a high school educational level may specify particular time requirements. The time estimation reusable object may specify that reading activities with “some new concepts” at an “engaged” depth require approximately 5.7 minutes per 500 words. In addition, the time estimation reusable object may specify that reflection questions require two minutes per question. The computer system may process a reading content element definition with an instructional text of 1051 words and nine embedded reflection questions. The computer system may use the time estimation reusable object to compute an estimated reading time. The computer system may apply the 5.7 minutes-per-500-words value to the 1051-word count. Furthermore, the computer system may add eighteen minutes for the nine reflection questions. The computer system may store the resulting time-on-task value with the content element definition. At a module level, the computer system may sum time-on-task values across all activities in the module.

At a course level or program level, the computer system may aggregate the values further. Moreover, the computer system may compare the aggregated totals against required credit hours or Carnegie Unit thresholds defined in program-level planning artifacts.

In some embodiments, aggregated time-on-task values derived from time estimation reusable objects may be used to support accreditation or compliance reporting. For each content element definition, the computer system may store an estimated time-on-task value computed from the time estimation reusable object. The computer system may then compute a module-level total by summing the time-on-task values of all content element definitions associated with a module. In addition, the computer system may compute course-level totals by summing module-level totals or all content element definitions linked to a course. Furthermore, the computer system may compute program-level totals by aggregating time-on-task across all courses in a program. The computer system may compare aggregated totals against required hour thresholds stored in program-level planning artifacts or accreditation constraint fields. For example, in an educational programming domain, the computer system may compare against a requirement of one hundred twenty hours of instructional time for a unit of credit. Moreover, the computer system may store comparative results.

The computer system may generate reports that show, for each course and program, the estimated instructional time and the distribution of time across content types. In addition, the reports may show the degree to which the program meets or exceeds mandated instructional time requirements.

In some embodiments, the computer system may compute and store alternative aggregated time-on-task totals for the same set of content element definitions. The computer system may use different time estimation reusable objects to compute alternative totals. For a given program, the computer system may apply a first time estimation reusable object associated with one accreditation framework. The computer system may store aggregated module-level, course-level, and program-level time totals in association with the identifier of that time estimation reusable object. The computer system may then apply a second time estimation reusable object associated with a different set of rules. Furthermore, the computer system may compute a second set of aggregated time totals for the same content. The computer system may present both sets of aggregates in accreditation or compliance reports. The aggregates may be labeled with the corresponding time estimation reusable object identifiers. Administrators may compare how the same content satisfies different sets of requirements.

Any domain-specific mapping between time totals and credential units may be encoded as data within the time estimation reusable objects. For example, particular credit-hour conversions may be encoded as data rather than as part of the generalized aggregation mechanism.

In some embodiments, UI components may present object-aware controls that reflect the subsets of reusable objects determined by a computer system and filtered by tenant and permission metadata. A design interface may retrieve, for a selected level in the hierarchical data model and for a current user role, a subset of RDOs. In addition, the design interface may retrieve RQOs, personality reusable objects, and taxonomy reusable objects. Furthermore, the design interface may display those reusable objects as selectable options in configuration or creation screens. A build interface may retrieve a subset of RBOs applicable to a selected platform and module element. Moreover, the build interface may present those RBOs as options when a user initiates a build operation. The UI may query the reusable object store with the same inheritance metadata, tenant identifiers, lock flags, and role-based permissions. Alternatively, the computer system may use the same parameters when assembling input sequences. As a result, users can only select reusable objects that are permitted at the current level and role. The UI may further display quality metrics associated with reusable objects, such as average review scores derived from RQO evaluations. Furthermore, the UI may guide selection of reusable objects for new content element definitions.

Figure 4:
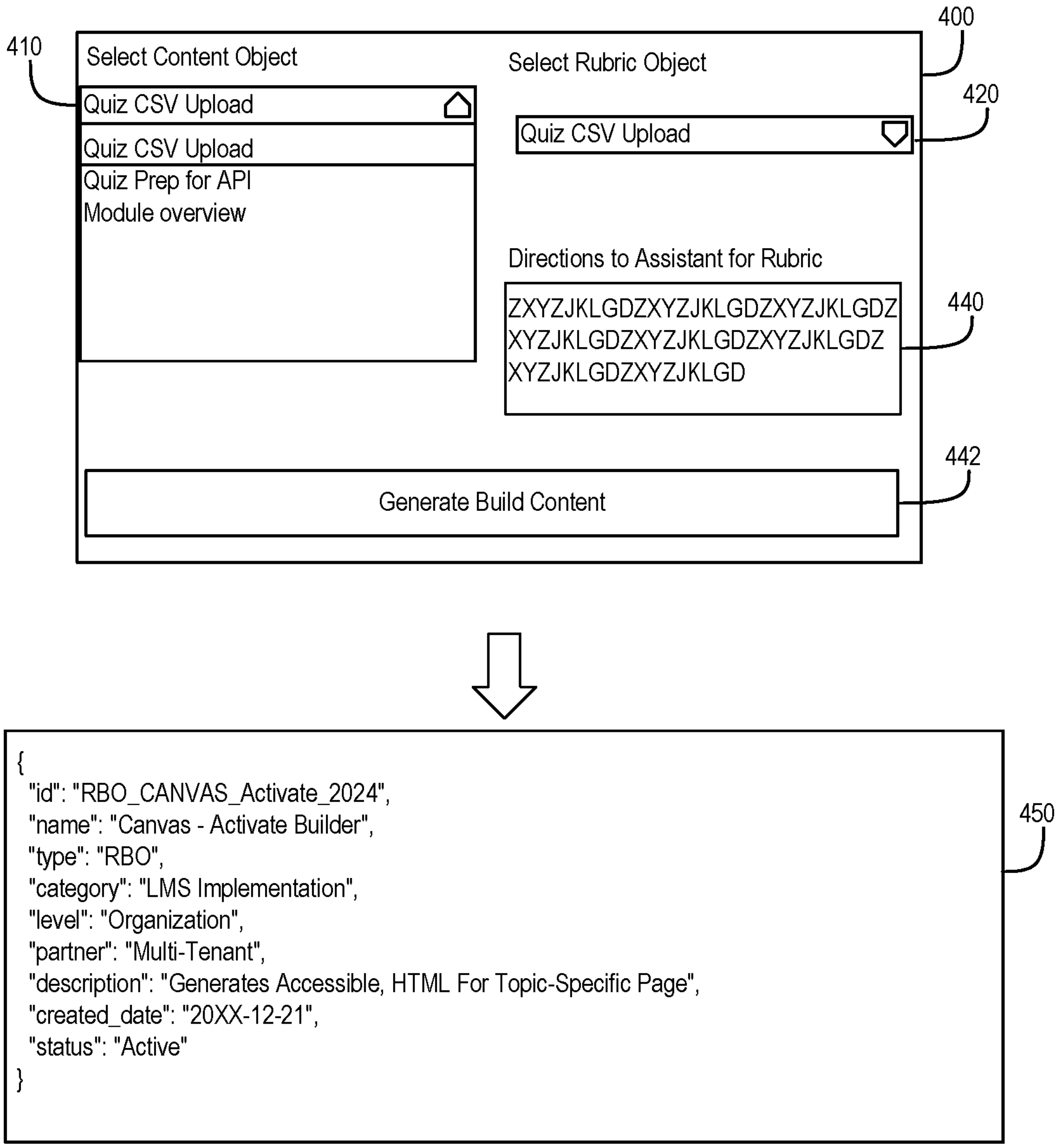
FIG. 4 shows an example user interface (UI) for constructing a reusable object, in accordance with one or more embodiments.

FIG. 4 shows an example UI 400 for constructing and using a reusable object, in accordance with one or more embodiments. The UI 400 presents a user with configurable controls that support selection and execution of reusable objects within a build workflow. The build workflow operates in accordance with the reusable object framework. The UI 400 displays a first dropdown menu 410. The first dropdown menu 410 allows the user to select a first reusable object from a library of RBOs. The reusable object is constructed as an RBO that obtains information from a structured configuration region of the UI 400 and from associated program and course context. The reusable object "Quiz CSV Upload" may convert that information into a CSV representation suitable for upload to an external system such as a learning management system.

In some embodiments, a reusable object represents a platform-specific RBO configured to generate implementation code for a particular delivery platform and module structure element. The RBO includes metadata fields such as an "lms_platform" field that specifies a target learning management system platform. Examples of target learning management system platforms include Canvas, Blackboard, or Moodle. The RBO further includes an "output_format" field that indicates a representation format for generated code. Examples of representation formats include HTML, CSV, JSON, or plain text. In addition, the RBO includes a "code_type" field that indicates one or more technologies used in the implementation code. Examples of technologies include HTML and cascading style sheets, comma-separated values text, or JavaScript. The RBO further includes a "module_structure_element" field that indicates a portion of a course structure for which the implementation code is intended. Examples of course structure portions include an activate phase, a study phase, a practice phase, or an assessment phase. Moreover, the RBO includes an "accessibility_compliance" field that stores an indication of one or more accessibility standards. An example of an accessibility standard is a Web Content Accessibility Guidelines (WCAG) level that the implementation code should satisfy. For example, the reusable object stores these metadata fields with "lms_platform" set to Canvas, "output_format" set to "CSV," and "code_type" indicating CSV text. Furthermore, the reusable object stores a "module_structure_element" indicating a quiz import and "accessibility_compliance" indicating that generated structures should support WCAG 2.1 AA. A computer system uses these metadata fields to construct build input sequences tailored to the target platform. Alternatively, the computer system uses these metadata fields to validate that generated implementation code conforms to platform-specific and accessibility constraints encoded in the RBO.

The UI 400 further includes a second dropdown menu 420. The second dropdown menu 420 allows the user to select a second build object that evaluates or transforms the output produced by the first reusable object. The second dropdown menu 420 presents a set of RBOs that are dedicated to post-processing or evaluation tasks. Examples of such RBOs include an RBO that validates CSV structure against a particular platform specification, an RBO that enforces accessibility or naming conventions, or an RBO that applies rubric-like checks to confirm presence of required columns and patterns. An example of such an RBO is "RBO_CSV_Validator_2025." The user selects such a second build object from the second dropdown menu 420. The system establishes a multi-stage build pipeline that first invokes a first reusable object to generate a CSV structure. The system then invokes the second build object selected from the second dropdown menu 420 to evaluate, transform, or annotate the CSV structure. The system applies the same hierarchical permission and inheritance model to the second dropdown menu 420. As a result, the user only accesses evaluation RBOs that the program and course configurations permit. In addition, the system automatically includes required or locked evaluation RBOs when a program administrator has designated such RBOs as mandatory.

The UI 400 further provides a text box 440. The text box 440 allows the user to input additional instructions or constraints that refine the behavior of a rubric or evaluation process executed in connection with the second build object. The text box 440 accepts free-form natural language instructions that specify additional quality or structural rules. Examples of such rules include custom column naming conventions, partner-specific data validation requirements, scoring thresholds for completeness, or special handling for particular activity types. The system treats the text entered in the text box 440 as supplemental rubric guidance that is processed by the contextual AI prompt assembly engine. The contextual AI prompt assembly engine combines the predefined logic of the selected RBO with the user-specified refinements. For example, the contextual AI prompt assembly engine combines the predefined logic of a CSV validator RBO with the user-specified refinements. In some embodiments, the text box 440 operates analogously to a lightweight RQO input channel. The text box 440 allows the user to express evaluation criteria that augment the rubric-like checks encoded in the underlying RBO. The system incorporates such criteria into the evaluation stage that follows CSV generation.

The UI 400 also includes a button 442. The button 442 allows the user to cause a computer system to generate a content element definition based on the selected objects and any text entered in the text box 440. After the user selects the first reusable object from the first dropdown menu 410 and selects the second build object from the second dropdown menu 420, the user optionally enters rubric instructions in the text box 440. The user then taps the button 442 to trigger execution of the build pipeline. In response to activation of the button 442, a computing subsystem invokes the first RBO selected in the first dropdown menu 410 to obtain configuration and context data. The computing subsystem generates a CSV structure that conforms to the RBO's LMS platform, "output_format," and "code_type" metadata. The computing subsystem then invokes the second build object selected from the second dropdown menu 420 to evaluate or transform the CSV structure. The computing subsystem uses the object's predefined rules and any rubric refinements from the text box 440 to perform the evaluation or transformation. For example, the computing subsystem checks required columns, verifies alignment with platform-specific constraints, or adds computed fields. The contextual AI prompt assembly engine assembles prompts that include program context, course context, relevant reusable object metadata, and the user-entered rubric instructions. The evaluation or transformation follows the sequential and simultaneous injection patterns defined by the reusable object framework. Based on these operations, the computing subsystem synthesizes a structured content element definition that captures the result of the generation and evaluation stages.

These coordinated operations within the UI 400 create or update an object that is represented visually and programmatically as a text block 450. The text block 450 displays a core object structure that reflects how the content element definition is stored within the reusable object system's common data model. The core object structure in the text block 450 includes core fields such as "id," "name," "category," "level," "partner," "description," "create_date," and "status." These core fields correspond to the universal fields present in all reusable objects. The system assigns a unique "id" to the generated content element definition. For example, the system assigns "RBO_CSV_Element_2025_007" as the "id." The system sets the "name" based on user input or conventions derived from the selected RBOs. For example, the system sets the "name" to "Canvas Quiz CSV Export for Module 3." In addition, the system sets the "category" to a value that indicates that the object represents a build pattern or CSV-based content element. Examples of such values include "LMS Implementation" or "CSV Export." The "level" field indicates the hierarchical origin of the object, such as Organization, Program, or Course. The object participates correctly in the inheritance model based on the "level" field. For example, if the user operates in a course-level context, the "level" is set to "Course" and the object inherits program-level constraints while remaining course-specific.

The "partner" field in the text block 450 identifies the owning organization or tenant. Examples of such identifiers include "PartnerA" or "Shared_Base." The "partner" field aligns with the multi-tenant permission system and governs which programs and courses access the generated object. The "description" field stores a human-readable explanation of the object's purpose and behavior. The explanation is derived from the base RBO descriptions, the platform-specific metadata, and the user-entered rubric instructions in the text box 440. For example, the explanation states "Generates and validates Canvas-ready CSV files for quiz imports, enforcing program-specific naming conventions." The "create_date" field records a timestamp corresponding to the time the user tapped the button 442. The "status" field indicates whether the object is Active, Draft, or Archived at creation time. The "status" field typically defaults to "Active" or "Draft" according to program rules. In some embodiments, the text block 450 additionally displays or internally stores type-specific metadata fields associated with RBOs. Such type-specific metadata fields include "type" set to "RBO," "output_format" set to "CSV," "lms_platform" set to a value such as "Canvas," and "code_type" set to "CSV text." The core visual emphasis remains on the core fields "id," "name," "category," "level," "partner," "description," "create_date," and "status." Through this disclosure representation, the text block 450 shows how interactions with the first dropdown menu 410, the second dropdown menu 420, the text box 440, and the button 442 result in a fully formed core object instance. The core object instance is persisted into the reusable object repository. In addition, the core object instance is governed by hierarchical inheritance and permission controls. Furthermore, the core object instance is reused by other build and quality processes within the broader system.

In some embodiments, the UI 400 may enforce constraints derived from alignment relationships and RQOs by preventing users from completing certain actions unless required conditions are met. For example, when a user attempts to save or submit a content element definition for review, a computer system may verify that the content element definition is aligned to at least one specification item in the list alignment data structure and may display an error message or disable submission controls if no alignment relationships are present. Similarly, when a user attempts to mark a content element definition as ready for publication, the computer system may automatically invoke one or more RQOs associated with the relevant program or course and may require that the content element definition achieve minimum scores or satisfy specified evaluation criteria before allowing publication. If the content element definition fails these checks, the UI 400 may present evaluation results and display recommended changes. A computer system may prevent progression to publication until the issues are addressed and the content element definition passes subsequent evaluations.

In some embodiments, a UI may be modified also indicate style and terminology constraints derived from personality reusable objects and taxonomy reusable objects. For instance, if a personality reusable object specifies a list of prohibited phrases or a taxonomy reusable object specifies that certain verbs are not permitted at a target classification level, the UI 400 may highlight occurrences of these terms in user-authored content or in generated content and may indicate that they violate configured constraints. The system 100 may provide controls that enable a user to request automatic revision, in which case the system 100 may invoke a content generation model with a revision prompt that includes the offending content segments, the applicable personality reusable object and taxonomy reusable object data, and instructions to replace prohibited terms with allowed alternatives. The revised content may then be presented to the user for acceptance and may be re-validated against the same constraints to ensure compliance.

FIG. 5 depicts a reusable object used for evaluation and outputs derived from applying the reusable object to generated content element definitions, in accordance with one or more embodiments. A RQO may provide a structured, machine-readable representation of one or more evaluation criteria. The evaluation criteria may be applied to content element definitions produced by a content generation model or other authoring process. The RQO may enable a quality review engine to determine ratings, generate explanations, and produce specific recommendations for improvement while operating independently of any particular subject domain or content type. In some embodiments, a user may select an RQO associated with a particular quality domain and review stage. The computer system may apply the selected RQO automatically whenever content element definitions reach the corresponding review point in a workflow.

An RQO structure 510 may illustrate how the computer system represents an individual quality rule or rubric entry within an RQO. The RQO structure 510 may include core fields such as "area," "category," "level," "score," "reasoning," and "Items to fix/recommendations." The field "area" may identify a broad evaluation dimension. The field "category" may identify a more specific classification within the identified area. The field "level" may represent an evaluation level for the criterion, which may correspond to a qualitative label or a numeric rating. The field "score" may capture a numerical or symbolic score used for aggregation and reporting across multiple criteria. The field "reasoning" may hold an explanation describing why the evaluation engine assigned the corresponding "level" and "score" to the criterion. The field "Items to fix/recommendations" may specify one or more recommended changes applied to the evaluated content to improve the outcome associated with the criterion. Together with the assigned scores and reasoning, these recommended changes may be used to form a review output that specifies parameters for modifying the content element definition. In some embodiments, the RQO structure 510 may further associate each criterion with additional metadata such as a quality domain identifier, a review stage indicator, or a scoring method type. The core fields "area," "category," "level," "score," "reasoning," and "Items to fix/recommendations" may remain common across different deployments.

When the computer system applies an RQO that includes an RQO structure 510 to a particular content element definition, an evaluation engine may generate a quality check. One example of a quality check is shown in an interface screen 530. The interface screen 530 may present the values of "area," "category," "level," and "score" for one or more criteria evaluated by the RQO. In addition, the interface screen 530 may present corresponding "reasoning" and "Items to fix/recommendations" information for each criterion. The evaluation engine may obtain an instance of the content element definition, the associated context from a hierarchical data model, and the criteria encoded in the RQO. The evaluation engine may compute a result for each criterion according to predefined rules. The interface screen 530 may therefore provide a user with a structured view of evaluation results. The structured view may indicate which quality dimensions the content element definition satisfies and which quality dimensions require revision. In some embodiments, the interface screen 530 may be presented during iterative design to provide realtime feedback. The realtime feedback may update as the content element definition changes.

The computer system may also apply an RQO to produce aggregated views of evaluation results such as tabular summaries in an interface screen 550. The interface screen 550 may display a table in which each row corresponds to a standard of review derived from one or more entries in the RQO. The table in interface screen 550 may recite, for each standard, a label describing the standard of review. Furthermore, the table may recite a status value indicating whether the standard is satisfied. The table may also recite a skill level or rubric level associated with the standard. Moreover, the table may recite a reason describing the basis for the status and one or more items to address. The status value may indicate outcomes such as satisfied, partially satisfied, or not satisfied. The skill level may be derived from or mapped to the "level" field of the RQO structure 510. The reason may correspond to the "reasoning" field. The items to address may correspond to the "Items to fix/recommendations" field, possibly summarized or combined across multiple evaluations. In some embodiments, the interface screen 550 may present aggregated results for a single content element definition. Alternatively, in other embodiments the interface screen 550 may summarize results across multiple content element definitions associated with a course, program, or other higher-level entity.

In some embodiments, the computer system may use RQOs in conjunction with taxonomy reusable objects to detect cognitive-level mismatches between specification items and content element definitions. For example, a list alignment data structure may indicate alignment between a target content element and a specification item. The taxonomy metadata of the specification item may associate the specification item with an "Analyze" level in a taxonomy reusable object. The taxonomy reusable object may define permitted verbs and patterns for the Analyze level, such as "analyze," "categorize," "compare," "differentiate," and "organize." If the content element definition associated with the specification item instructs learners to "List five causes of the Civil War," the computer system may detect a mismatch. The verb "list" belongs to a "Remember" level in the taxonomy reusable object rather than to the Analyze level. An RQO operating in an alignment area and category may cause the computer system to generate an evaluation entry. The evaluation entry may indicate that the cognitive level of the activity is below the cognitive level expected by the aligned specification item. Furthermore, the evaluation entry may populate the "level," "score," "reasoning," and "Items to fix/recommendations" fields in the RQO structure with information. The information may indicate that the activity only requires recall and should be revised to require analytical reasoning about causes and relationships.

In some embodiments, when the evaluation engine detects such a mismatch, the computer system may use the evaluation results and the taxonomy reusable object to generate a revised content element definition. The computer system may construct a revision prompt that embeds the initial content element definition. In addition, the revision prompt may embed the evaluation results from one or more RQOs. Furthermore, the revision prompt may embed the permitted verbs and patterns for the target taxonomy level from the taxonomy reusable object. The computer system may instruct a content generation model to transform the initial activity so that the transformed activity uses verbs and task structures consistent with the target taxonomy level. For example, the computer system may revise the prompt to "Analyze how economic, political, and social factors interacted to cause the Civil War and explain the relationships between these factors." The computer system may receive a revised content element definition from the content generation model. The computer system may validate that the revised definition uses permitted verbs and patterns for the taxonomy level. Moreover, the computer system may validate that the revised definition satisfies the evaluation criteria encoded in the RQOs. The computer system may store the revised content element definition in place of or alongside the initial version.

The quality evaluation that populates the interface screen 550 may rely not only on the content element definition being evaluated. The quality evaluation may also rely on information retrieved from other records in a hierarchical data structure. The computer system may store related records at multiple levels of a hierarchy. In addition, the evaluation engine may compare the content element definition with those records to determine whether the content satisfies certain standards of review. For example, in one implementation the hierarchical data structure may store a list of higher-level requirements or outcomes at an organization or program level. Furthermore, the hierarchical data structure may store a list of intermediate elements at a course level and a list of associated activities. The RQO may cause the evaluation engine to check whether the content element definition connects appropriately to the relevant records at other levels. The interface screen 550 may then display, for each standard of review, the status derived from cross-level comparisons. In addition, the interface screen 550 may display the skill level associated with the standard. The interface screen 550 may also display the reasoning that references specific relationships in the hierarchy. Moreover, the interface screen 550 may display items to address that instruct the user to add or adjust relationships or content.

In some embodiments, the RQO that defines the criteria shown in the RQO structure 510 may be created or selected at an organization or program level. The RQO may be locked for use across multiple courses or content element definitions. The interface screen 530 and 550 may therefore present evaluations that are consistent for all users operating within the same organizational or program context. The same RQO may be applied regardless of which user initiated the review. In other embodiments, additional RQOs may be defined at a course level or activity level. The additional RQOs may allow finer-grained checks that supplement organization-level RQOs. For example, a user may configure an RQO that defines mandatory checks for a particular accreditation framework. The user may lock the RQO at the program level so that the RQO is always applied for the program. Alternatively, a user may create additional RQOs that define course-specific stylistic preferences. By using the RQO structure 510 and the evaluation process illustrated by the interface screen 530 and the interface screen 550, the computer system may support multiple layers of quality standards. Furthermore, the computer system may maintain a consistent representation for quality results.

Figure 6:
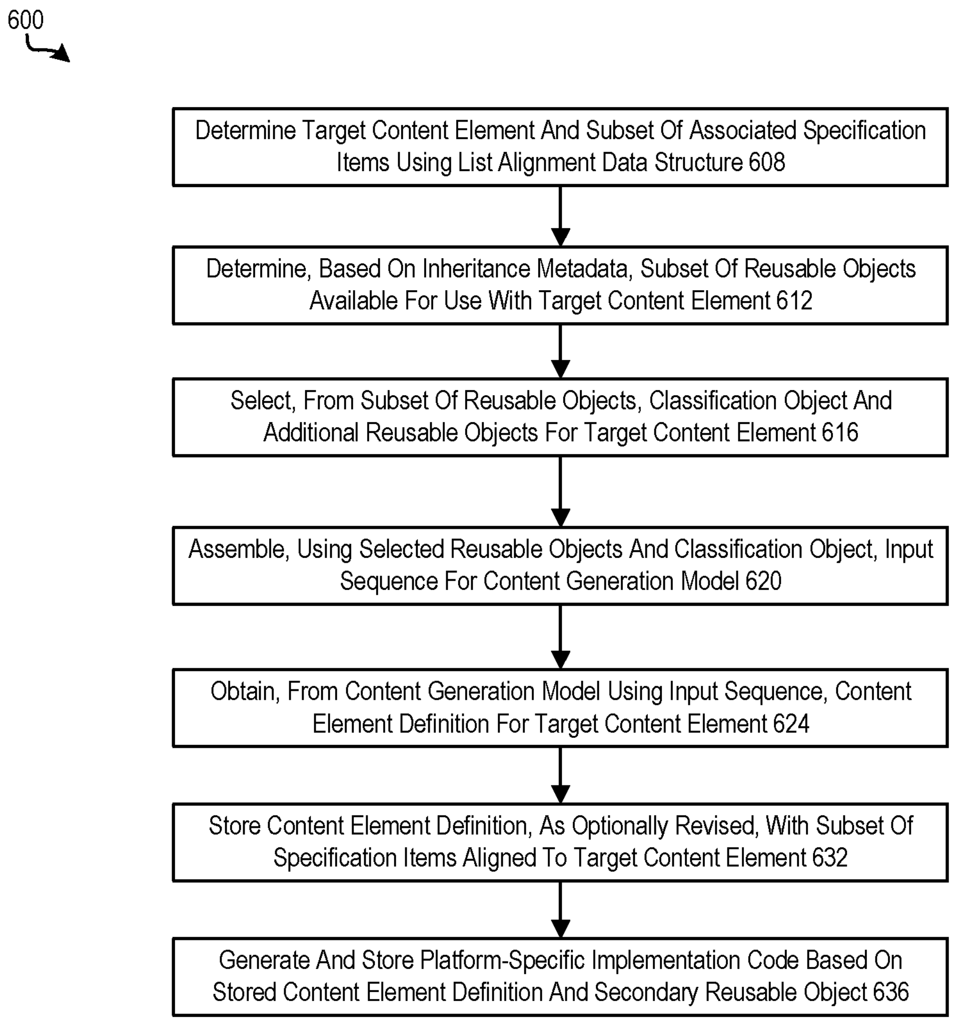
FIG. 6 shows a flowchart of a process for storing and using hierarchical information to form a model input context using build objects, in accordance with one or more embodiments.

FIG. 6 shows a flowchart of a process 600 for storing and using hierarchical information to form a model input context using build objects, in accordance with one or more embodiments. Some embodiments may determine a target content element and a subset of associated specification items using a list alignment data structure, as indicated by block 608. A computer system may determine a target content element by receiving or retrieving an identifier for one item within a list alignment data structure. The computer system may then access alignment relationships within the list alignment data structure. In addition, the computer system may identify specification items that connect to the target content element according to predefined alignment types and list or item metadata. The computer system may filter these specification items by role, list type, or hierarchy rules to form a subset of associated specification items. The subset of associated specification items may describe requirements, outcomes, standards, or other constraints for the target content element. The computer system may use the subset of associated specification items as contextual input for subsequent operations. Furthermore, the computer system may supply the subset to AI prompt assembly, quality review procedures, or reporting processes that depend on the specification items.

Some embodiments may determine, based on inheritance metadata, a subset of reusable objects available for use with the target content element, as indicated by block 612. A computer system may determine a subset of reusable objects for a lower hierarchical level by evaluating inheritance metadata associated with reusable objects at a higher hierarchical level. The computer system may read object records that include origin level, owning entity identifiers, and inheritance attributes such as locked or optional. In addition, the computer system may traverse a hierarchical data model connecting a first level entity and a second level entity to identify which objects should propagate downward. The computer system may filter objects based on inheritance metadata such as exclusion flags, permission scopes, and selection indicators for the second level. Moreover, the computer system may output a concrete subset of reusable objects that are available for use at the second level. The computer system may mark each reusable object with usage constraints like locked or optional.

Some embodiments may select, from the subset of reusable objects, a classification object and additional reusable objects for the target content element, as indicated by block 616. A computer system may select a classification object that is associated with a subset of specification items. The computer system may examine associations between each specification item and available classification objects. In addition, the computer system may read metadata from the specification items that reference a taxonomy identifier and possibly a classification level identifier. The computer system may identify a classification object, such as a learning taxonomy object, whose identifier matches the taxonomy referenced by the specification items. Furthermore, the computer system may extract structured classification data from the classification object. The structured classification data may include terms grouped under classification levels. For example, the structured classification data may include verbs, sample objectives, and example questions. The computer system may further determine which classification level corresponds to the subset of specification items. Moreover, the computer system may isolate the set of terms associated with that classification level for use in constrained content generation.

Some embodiments may assemble, using the selected reusable objects and the classification object, an input sequence for a content generation model, as indicated by block 620. A computer system may assemble an input sequence for a content generation model by combining hierarchical context, a selected reusable object, and a classification object into a structured representation. The computer system may derive hierarchical context from the subset of reusable objects available at the current level. The hierarchical context may include directions, templates, and examples that define organizational and program standards. In addition, the computer system may select a particular reusable object from that subset, such as a specific design pattern. The computer system may embed that reusable object's detailed instructions and template into the input sequence. Furthermore, the computer system may embed the classification object into the input sequence. The computer system may include a portion of structured classification data that corresponds to a classification level associated with the aligned specification items. The computer system may include within that portion the set of terms that belong to the classification level. Moreover, the computer system may instruct the content generation model to use only terms from that set when generating specific parts of the content element definition.

Some embodiments may obtain, from the content generation model using the input sequence, a content element definition for the target content element, as indicated by block 624. A computer system may transmit the assembled input sequence to a content generation model. In addition, the computer system may receive a response that contains a content element definition for the target content element. The computer system may parse the response payload to extract structured fields that describe the content element. For example, the structured fields may include title, narrative text, instructions, and any required metadata. Furthermore, the computer system may validate that the response conforms to an expected schema for content element definitions. The computer system may apply normalization or minor corrections where necessary. Moreover, the computer system may represent the generated content element definition as an internal object instance that is ready for storage and alignment operations.

Some embodiments may determine whether the content element definition satisfies one or more evaluation reusable objects, as indicated by block 628. A computer system may obtain evaluation reusable objects that correspond to a program, a course, or a partner organization. The evaluation reusable objects may apply to the target content element type. In addition, the computer system may read evaluation criteria stored in the evaluation reusable objects. For example, the evaluation criteria may include quality dimensions, scoring methods, and threshold values. The computer system may also identify a classification object associated with specification items aligned to the content element definition. Furthermore, the computer system may obtain classification data such as allowed verbs and cognitive descriptors for a target classification level. The computer system may analyze textual and structural components of the content element definition against the evaluation criteria from the evaluation reusable objects.

The computer system may compare verbs, phrasing patterns, structural sections, and metadata fields against the classification data. The comparison may detect deviations from the target classification level. In addition, the computer system may construct one or more evaluation prompts that embed the content element definition. The evaluation prompts may embed the evaluation criteria from the evaluation reusable objects and the classification data from the classification object. Furthermore, the computer system may transmit the evaluation prompts to a content generation model. The computer system may receive structured evaluation results that include scores, detected issues, and classification consistency findings. The structured evaluation results may be provided as a review output that includes parameters for modifying the content element definition. Moreover, the computer system may aggregate the structured evaluation results into a combined evaluation outcome. The computer system may determine whether the content element definition satisfies the evaluation reusable objects based on the combined evaluation outcome and associated threshold values.

In some embodiments, a computer system may associate each reusable object with one or more quality metrics. For example, a RDO or RBO may be associated with quality metrics. The quality metrics may be derived from evaluation results produced by applying RQOs to content element definitions generated using that reusable object. The computer system may maintain, for each reusable object, aggregated metrics. For example, the computer system may maintain an avg_alignment_score computed from alignment-related evaluation criteria. In addition, the computer system may maintain an avg pedagogical_score computed from pedagogy-related evaluation criteria. Furthermore, the computer system may maintain an evaluation_count indicating how many content element definitions have been reviewed with that reusable object. The computer system may also maintain a last_evaluated timestamp. When the computer system selects a reusable object from the subset of reusable objects, the computer system may consider compatibility with a target content element. For example, compatibility may be based on activity type, module element, and taxonomy level. The computer system may rank compatible reusable objects using these quality metrics. The ranking effectively defines a selection priority that guides automatic selection towards reusable objects demonstrated to yield higher quality content. Moreover, the computer system may prefer reusable objects with higher average scores or greater evaluation counts. Over time, selection may bias toward reusable objects that yield higher-quality content element definitions. Alternatively, reusable objects associated with lower quality metrics may be selected less frequently or flagged for revision by administrators.

Some embodiments may update the content element definition based on the one or more evaluation reusable objects, as indicated by block 630. A computer system may obtain the initial content element definition together with structured evaluation results. For example, based on the structured evaluation results, the computer system may construct a revision input using the review output and transmit the revision input to the content generation model. The structured evaluation results may identify classification inconsistencies, quality findings, and recommended changes derived from one or more evaluation reusable objects. In addition, the computer system may obtain structured classification data from a classification object. For example, the structured classification data may include allowed verbs, allowed cognitive descriptors, and other allowed terms for a target classification level associated with aligned specification items. Furthermore, the computer system may combine classification-based findings and quality-based recommendations into a set of proposed modifications. The set of proposed modifications may reference specific fields or sections of the initial content element definition.

In some embodiments, revision operations may be performed iteratively until the content element definition satisfies both evaluation criteria from RQOs and classification constraints from taxonomy reusable objects. After receiving structured evaluation results, including recommended modifications and identified classification inconsistencies, the computer system may construct a revision input for a content generation model. The revision input may include the initial content element definition, the evaluation results, and structured classification data from the relevant classification object. The content generation model may produce a revised content element definition that implements one or more recommended changes and replaces disallowed terms with allowed terms drawn from the classification object. The computer system may then re-evaluate the revised content element definition using the same RQOs and classification validation rules. The computer system may repeat the revision process if necessary until the revised content element definition satisfies threshold conditions. For example, threshold conditions may include achieving required alignment and quality scores. The computer system may store the content element definition in association with the subset of specification items after threshold conditions are satisfied.

The computer system may construct a revision prompt that embeds the initial content element definition, the classification data, the proposed modifications, and references to the evaluation reusable objects. The evaluation reusable objects supply the evaluation criteria. The computer system may instruct a content generation model to generate a revised content element definition that implements the proposed modifications. In addition, the computer system may instruct the content generation model to replace disallowed terms with allowed terms drawn from the classification data. The computer system may receive a response from the content generation model. Furthermore, the computer system may parse the response into structured fields. For example, such structured fields may include title, narrative text, instructions, and metadata. The computer system may validate that the revised content element definition conforms to an expected schema. Moreover, the computer system may validate that the revised content element definition incorporates the proposed modifications. The computer system may also validate that the revised content element definition adheres to the allowed terms and cognitive descriptors specified by the classification object.

Some embodiments may store the content element definition with the subset of specification items aligned to the target content element, as indicated by block 632. A computer system may store the generated content element definition in persistent storage. In addition, the computer system may create explicit alignment relationships between the content element definition and the subset of specification items. The computer system may insert a record representing the content element definition into a content element repository. The record may include serialized structured data that describes the content element. The computer system may then write alignment records into a list alignment data structure. The alignment records may associate the stored content element identifier with each specification item identifier from the previously determined subset. Furthermore, the computer system may enforce referential integrity between the content element repository and the alignment relationships. The computer system may thus maintain a persistent association between the content element definition and the aligned specification items. For example, the persistent association may support later visualization, quality review, and accreditation reporting.

Some embodiments may generate and store platform-specific implementation code based on the stored content element definition and a secondary reusable object, as indicated by block 636. A computer system may generate platform-specific implementation code from a stored content element definition and a secondary reusable object such as a RBO. The computer system may retrieve a content element definition record from a repository. In addition, the computer system may deserialize structured fields that describe the content element. For example, the structured fields may include title, instructions, sections, and associated specification items. The computer system may then select a secondary reusable object that targets a particular delivery platform and module element. The secondary reusable object may include a code template, formatting rules, accessibility requirements, and brand styling information. Furthermore, the computer system may combine the content element definition and the secondary reusable object. The computer system may combine the content element definition and the secondary reusable object by filling a static code template with values from the content element definition. Alternatively, the computer system may invoke a content generation model with a build prompt that embeds the secondary reusable object's directions, template, and example code.

The computer system may receive or produce implementation code that conforms to the requirements of the selected platform. For example, platform requirements may include HTML for a learning management system page or CSV content for a platform import. The computer system may validate that the implementation code satisfies structural and accessibility constraints defined by the secondary reusable object. The computer system may then store the implementation code in association with the originating content element definition, the secondary reusable object identifier, and a platform identifier. The computer system may store the implementation code in a persistent implementation repository. The computer system may later retrieve the stored implementation code. Furthermore, the computer system may deploy the implementation code to the target platform through an integration interface or export mechanism.

In some embodiments, secondary reusable objects that specify platform-specific implementation templates may be represented as RBOs configured to generate implementation code for different delivery platforms. A RBO may include a platform field indicating a target platform. For example, target platforms may include a particular learning management system, content repository, or export format. In addition, the RBO may include a module element field indicating which portion of a course structure the implementation code targets. Furthermore, the RBO may include a code-type field indicating a representation. For example, representations may include HTML markup, cascading style sheets, JavaScript, comma-separated values, or another serial format.

The RBO may further include directions that instruct the content generation model how to transform a content element definition into implementation code. The implementation code may satisfy platform conventions. Moreover, the RBO may include an implementation template that encodes structural and styling patterns with placeholders for content element definition fields. The RBO may also include one or more example implementations. When the storage association component 348 stores a content element definition, the system may later select a RBO. Selection may be based on platform parameters and module element identifiers. The system may assemble a build input sequence that includes the content element definition and the RBO. In addition, the system may obtain implementation code from the content generation model. Furthermore, the system may validate the implementation code against accessibility requirements and platform constraints encoded in the RBO. The system may store the implementation code for deployment to the target platform.

Additional Information

The above-described embodiments of the present disclosure are presented for purposes of illustration and not of limitation, and the present disclosure is limited only by the claims which follow. Furthermore, it should be noted that the features and limitations described in any embodiment may be applied to one or more other embodiments herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Furthermore, not all operations of a flowchart need to be performed.

Furthermore, the computing devices described in this disclosure may be any type of computing device unless otherwise stated, including, but not limited to, a laptop computer, a tablet computer, a hand-held computer, and/or other computing equipment (e.g., a server), including "smart," wireless, wearable, and/or mobile devices. Furthermore, the embodiments described in this disclosure may include an individual device that performs some or all the operations described in this disclosure. Alternatively, other embodiments may include multiple computing devices acting collectively to perform some or all the operations described in this disclosure.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. One or more non-transitory machine-readable media storing instructions may include instructions included on a single medium or instructions distributed across multiple media. For example, non-transitory media may act as one or more memory, where one or more memory may store program instructions that are written as source files or written in machine-executable program code. The processing devices may include one or more devices configured through hardware, firmware, and/or software to be specifically designed for the execution of one or more of the operations of the methods.

In some embodiments, the various computer systems and subsystems illustrated in FIG. 1 or other figures described in this disclosure may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include one or more relational databases. Alternatively, or additionally, the set of databases or other electronic storage used in this disclosure may include one or more non-relational databases.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communication networks or combination of communication networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storage may include one or more non-transitory machine-readable media (e.g., storage media) that electronically store information. The storage media of the electronic storages may include one or both of (i) system storage that is provided integrally (e.g., substantially non-removable) with servers or client computing devices, or (ii) removable storage that is removably connectable to the servers or client computing devices via port (e.g., a USB port, a firewire port, etc.) or drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device, such as a computer screen, and/or a dedicated input device, such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than a mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, “a portion” refers to a part of, or the entirety of (i.e., the entire portion), a given item (e.g., data) unless the context clearly dictates otherwise.

Unless the context clearly indicates otherwise, ordinal numbers used to denote an item do not define the item’s position. For example, an item that may be a first item of a set of items even if the item is not the first item to have been added to the set of items or is otherwise indicated to be listed as the first item of an ordering of the set of items. Thus, for example, if a set of items is sorted in a sequence from “item 1,” “item 2,” and “item 3,” the first item of a set of items may be “item 2” unless otherwise stated. Furthermore, a “set” may refer to a singular form or a plural form, such that a “set of items” may refer to one item or a plurality of items.

Enumerated Embodiments

The present techniques will be better understood with reference to the following enumerated clauses:

Embodiment 1: A method is provided, where the method includes determining, based on inheritance metadata for a plurality of reusable objects associated with a first level of a hierarchical data model comprising the first level and a second level, a subset of reusable objects that is available for use at the second level. The method includes identifying, by accessing alignment relationships between generated content elements and specification items in a list alignment data structure, a subset of specification items associated with a target content element. The method includes selecting, based on associations between the specification items and classification objects, a classification object that is associated with the subset of specification items. The method includes assembling an input sequence for a content generation model to comprise hierarchical context derived from the subset of reusable objects, a reusable object selected from the subset of reusable objects, and the classification object. A portion of structured classification data of the classification object is associated with the subset of the specification items. The portion of the structured classification data constrains the content generation model to use a set of terms indicated by the structured classification data. The method includes obtaining, from the content generation model, a content element definition for the target content element. The method includes storing the content element definition in association with the subset of specification items that is aligned to the target content element.

Embodiment 2: A method is provided, where the method includes determining, based on inheritance metadata for a plurality of reusable objects associated with a first level of a hierarchical data model comprising the first level and a second level, a subset of reusable objects that is available for use at the second level. The method includes identifying, by obtaining indications of alignment relationships between generated content elements and specification items in a list alignment data structure, a subset of specification items associated with a target content element. The method includes selecting, based on associations between the specification items and classification objects, a classification object that is associated with the subset of specification items. The classification object comprises structured classification data indicating a set of terms associated with a classification level that is associated with the subset of specification items. The method includes assembling an input sequence for a content generation model to comprise hierarchical context derived from the subset of reusable objects, a reusable object selected from the subset of reusable objects, and the classification object. A portion of the structured classification data corresponds to the classification level. The portion of the structured classification data constrains the content generation model to use the set of terms. The method includes obtaining, from the content generation model, a content element definition for the target content element. The method includes storing the content element definition in association with the subset of specification items that is aligned to the target content element.

Embodiment 3: A method is provided, where the method includes, responsive to a request received from a client device via the communication network that specifies a target content element associated with a second level of a hierarchical data model comprising a first level and the second level, determining a subset of reusable objects that is available for use at the second level. Determining the subset of reusable objects is based on inheritance metadata indicating associations between levels of the hierarchical data model for a plurality of reusable objects associated with the first level. The method includes retrieving, from an alignment data store, alignment relationships between generated content elements and specification items. The method further includes identifying, using the alignment relationships, a subset of the specification items that is linked to the target content element. The method includes selecting a candidate classification object that is associated with the subset of the specification items based on associations between the specification items and classification objects of the plurality of reusable objects. The candidate classification object comprises structured classification data indicating required terms. The method includes assembling, at the one or more servers, an input sequence for a content generation model to comprise hierarchical context derived from the subset of reusable objects, a reusable object selected from the subset of reusable objects based on an association between the reusable object and the target content element, and the candidate classification object. A portion of the structured classification data corresponds to a classification level associated with the subset of the specification items. The portion of the structured classification data constrains the content generation model to use the required terms in accordance with the classification level. Inclusion of the candidate classification object in the input sequence reduces generation errors by constraining the content generation model. The method includes transmitting the input sequence to the content generation model to obtain a content element definition for the target content element. The method includes storing the content element definition in association with the subset of the specification items that is linked to the target content element by the alignment relationships.

Embodiment 4: A method of any of the embodiments above, wherein the plurality of reusable objects further comprises second reusable objects that specify evaluation criteria for the generated content elements, the method further includes assembling, after obtaining the content element definition, a review input sequence for the content generation model to comprise the content element definition and a selected object of the second reusable objects. The method includes obtaining a review output comprising parameters for modifying the content element definition by using the review input sequence. The method includes generating, based on the review output, a revised content element definition.

Embodiment 5: A method of any of the embodiments above, wherein the plurality of reusable objects further comprises style-constraint reusable objects that specify constraints on textual characteristics of the generated content elements. Assembling the input sequence for the content generation model comprises inserting, at a first portion of the input sequence, a style-constraint reusable object from the plurality of reusable objects. The style-constraint reusable object specifies a style parameter indicating a sentence length parameter or a constraint on the use of specified terms.

Embodiment 6: A method of any of the embodiments above, wherein the plurality of reusable objects further comprises secondary reusable objects that specify platform-specific implementation templates for the target content element, the method further includes selecting, based on a platform parameter associated with the target content element, a first object of the secondary reusable objects from the plurality of reusable objects. The method includes assembling a build input sequence to comprise the content element definition and the first object. The method includes obtaining, in response to providing the build input sequence, implementation code for the target content element. The method includes storing the implementation code in association with the content element definition.

Embodiment 7: A method of any of the embodiments above, wherein a first reusable object of the plurality of reusable objects is associated with one or more quality metrics derived from the review output stored in association with the content element definition, and determining the subset of reusable objects comprises adjusting, based on the one or more quality metrics associated with the first reusable object, a selection priority of the first reusable object.

Embodiment 8: A method of any of the embodiments above, wherein the inheritance metadata for the plurality of reusable objects comprises a lock flag that indicates that the reusable object is mandatory at the second level, and determining the subset of reusable objects comprises including, in the subset of reusable objects, each reusable object having the lock flag set.

Embodiment 9: A method of any of the embodiments above, wherein the classification object comprises, for a plurality of taxonomy levels, level definitions that specify sets of permitted linguistic or structural features and validation rules, the method further includes parsing the content element definition to identify a plurality of features of the content element definition. The method includes determining one or more taxonomy levels, from the plurality of taxonomy levels, that correspond to the subset of specification items based on information in the classification object. The method includes comparing a portion of the plurality of features to the sets of permitted linguistic or structural features associated with the one or more taxonomy levels that correspond to the subset of specification items. The method includes storing the content element definition in association with the subset of specification items in response to determining that the content element definition satisfies the validation rules associated with the one or more taxonomy levels.

Embodiment 10: A method of any of the embodiments above, wherein a first reusable object of the plurality of reusable objects further comprises a tenant identifier that identifies a tenant associated with the first reusable object, and wherein a second reusable object of the plurality of reusable objects is designated as shared across multiple tenants, and wherein determining the subset of reusable objects comprises filtering the plurality of reusable objects based on the tenant identifier to exclude reusable objects associated with tenants other than a tenant associated with the target content element while including the second reusable object. Determining the subset of reusable objects further comprises applying the inheritance metadata to the filtered plurality of reusable objects to determine the subset of reusable objects.

Embodiment 11: A tangible, non-transitory, machine-readable medium is provided, storing instructions that, when executed by a data processing apparatus, cause the data processing apparatus to perform operations comprising those of any of embodiments 1-10.

Embodiment 12: A system is provided, the system comprising one or more processors and memory storing instructions. When executed by the processors, the instructions cause the processors to effectuate operations comprising those of any of embodiments 1-10.

Embodiment 13: A system is provided, the system comprising means for performing any of embodiments 1-10.

What is claimed is:

1. A system for generating reduced-error structured content across a network using reusable objects, the system comprising one or more servers each comprising one or more processors, one or more memories, and a network interface configured to communicate over a communication network, the one or more memories storing instructions that, when executed by the one or more processors, cause the one or more servers to perform operations comprising:

responsive to a request received from a client device via the communication network that specifies a target content element associated with a second level of a hierarchical data model comprising a first level and the second level, determining a subset of reusable objects that is available for use at the second level based on inheritance metadata indicating associations between levels of the hierarchical data model for a plurality of reusable objects associated with the first level;

generated content elements retrieving, from an alignment data store, alignment relationships between generated content elements and specification items to identify, using the alignment relationships, a subset of the specification items that is linked to the target content element;

selecting a candidate classification object that is associated with the subset of the specification items based on associations between the specification items and classification objects of the plurality of reusable objects, wherein the candidate classification object comprises structured classification data indicating required terms;

assembling, at the one or more servers, an input sequence for a content generation model to comprise hierarchical context derived from the subset of reusable objects, a reusable object selected from the subset of reusable objects based on an association between the reusable object and the target content element, and the candidate classification object, wherein a portion of the structured classification data corresponds to a classification level associated with the subset of the specification items, and wherein the portion of the structured classification data constrains the content generation model to use the required terms in accordance with the classification level, and wherein inclusion of the candidate classification object in the input sequence reduces generation errors by constraining the content generation model;

transmitting the input sequence to the content generation model to obtain a content element definition for the target content element; and storing the content element definition in association with the subset of the specification items that is linked to the target content element by the alignment relationships.

2. The system of claim 1, wherein the plurality of reusable objects further comprises second reusable objects that specify evaluation criteria for the generated content elements, the operations further comprising:

assembling, after obtaining the content element definition, a review input sequence for the content generation model to comprise the content element definition and a selected object of the second reusable objects;

obtaining a review output comprising parameters for modifying the content element definition by using the review input sequence; and generating, based on the review output, a revised content element definition.

3. The system of claim 1, wherein:

the plurality of reusable objects further comprises style-constraint reusable objects that specify constraints on textual characteristics of the generated content elements; and assembling the input sequence for the content generation model comprises inserting, at a first portion of the input sequence, a style-constraint reusable object from the plurality of reusable objects, the style-constraint reusable object specifying a style parameter indicating sentence length parameter or a constraint on the use of specified terms.

4. The system of claim 1, wherein the plurality of reusable objects further comprises secondary reusable objects that specify platform-specific implementation templates for the target content element, the operations further comprising:

selecting, based on a platform parameter associated with the target content element, a first object of the secondary reusable objects from the plurality of reusable objects;

assembling a build input sequence to comprise the content element definition and the first object;

obtaining, in response to providing the build input sequence, implementation code for the target content element; and storing the implementation code in association with the content element definition.

5. A method comprising:

determining, based on inheritance metadata for a plurality of reusable objects associated with a first level of a hierarchical data model comprising the first level and a second level, a subset of reusable objects that is available for use at the second level;

identifying, by obtaining indications of alignment relationships between generated content elements and specification items in a list alignment data structure, a subset of specification items associated with a target content element;

selecting, based on associations between the specification items and classification objects, a classification object that is associated with the subset of specification items, the classification object comprising structured classification data indicating a set of terms associated with a classification level that is associated with the subset of specification items;

assembling an input sequence for a content generation model to comprise hierarchical context derived from the subset of reusable objects, a reusable object selected from the subset of reusable objects, and the classification object, wherein a portion of the structured classification data corresponds to the classification level, and wherein the portion of the structured classification data constrains the content generation model to use the set of terms;

obtaining, from the content generation model, a content element definition for the target content element; and storing the content element definition in association with the subset of specification items that is aligned to the target content element.

6. The method of claim 5, wherein the plurality of reusable objects further comprises second reusable objects that specify evaluation criteria for the generated content elements, further comprising:

assembling, after obtaining the content element definition, a review input sequence for the content generation model to comprise the content element definition and a selected object of the second reusable objects;

obtaining a review output comprising parameters for modifying the content element definition by using the review input sequence; and generating, based on the review output, a revised content element definition.

7. The method of claim 6, wherein:

a first reusable object of the plurality of reusable objects is associated with one or more quality metrics derived from the review output stored in association with the content element definition, and determining the subset of reusable objects comprises adjusting, based on the one or more quality metrics associated with the first reusable object, a selection priority of the first reusable object.

8. The method of claim 5, wherein:

the plurality of reusable objects further comprises style-constraint reusable objects that specify constraints on textual characteristics of the generated content elements; and assembling the input sequence for the content generation model comprises inserting, at a first portion of the input sequence, a style-constraint reusable object from the plurality of reusable objects, the style-constraint reusable object specifying a style parameter indicating sentence length parameter or a constraint on the use of specified terms.

9. The method of claim 5, wherein the plurality of reusable objects further comprises secondary reusable objects that specify platform-specific implementation templates for the target content element, further comprising:

selecting, based on a platform parameter associated with the target content element, a first object of the secondary reusable objects from the plurality of reusable objects;

assembling a build input sequence to comprise the content element definition and the first object;

obtaining, in response to providing the build input sequence, implementation code for the target content element; and storing the implementation code in association with the content element definition.

10. The method of claim 5, wherein:

the inheritance metadata for the plurality of reusable objects comprises a lock flag that indicates that the reusable object is mandatory at the second level; and determining the subset of reusable objects comprises including, in the subset of reusable objects, each reusable object having the lock flag set.

11. The method of claim 5, wherein the classification object comprises, for a plurality of taxonomy levels, level definitions that specify sets of permitted linguistic or structural features and validation rules, further comprising:

parsing the content element definition to identify a plurality of features of the content element definition;

determining one or more taxonomy levels, from the plurality of taxonomy levels, that correspond to the subset of specification items based on information in the classification object;

comparing a portion of the plurality of features to the sets of permitted linguistic or structural features associated with the one or more taxonomy levels that correspond to the subset of specification items; and storing the content element definition in association with the subset of specification items in response to determining that the content element definition satisfies the validation rules associated with the one or more taxonomy levels.

12. The method of claim 5, wherein a first reusable object of the plurality of reusable objects further comprises a tenant identifier that identifies a tenant associated with the first reusable object, and wherein a second reusable object of the plurality of reusable objects is designated as shared across multiple tenants, and wherein determining the subset of reusable objects comprises:

filtering the plurality of reusable objects based on the tenant identifier to exclude reusable objects associated with tenants other than a tenant associated with the target content element while including the second reusable object; and applying the inheritance metadata to the filtered plurality of reusable objects to determine the subset of reusable objects.

13. One or more non-transitory, machine-readable media storing instructions that, when executed by one or more processors, cause the one or more processors to perform operations comprising:

determining, based on inheritance metadata for a plurality of reusable objects associated with a first level of a hierarchical data model comprising the first level and a second level, a subset of reusable objects that is available for use at the second level;

identifying, by accessing alignment relationships between generated content elements and specification items in a list alignment data structure, a subset of specification items associated with a target content element;

selecting, based on associations between the specification items and classification objects, a classification object that is associated with the subset of specification items;

assembling an input sequence for a content generation model to comprise hierarchical context derived from the subset of reusable objects, a reusable object selected from the subset of reusable objects, and the classification object, wherein a portion of structured classification data of the classification object is associated with the subset of the specification items, and wherein the portion of the structured classification data constrains the content generation model to use a set of terms indicated by the structured classification data;

obtaining, from the content generation model, an content element definition for the target content element; and storing the content element definition in association with the subset of specification items that is aligned to the target content element.

14. The one or more non-transitory, machine-readable media of claim 13, wherein the plurality of reusable objects further comprises second reusable objects that specify evaluation criteria for the generated content elements, the operations further comprising:

assembling, after obtaining the content element definition, a review input sequence for the content generation model to comprise the content element definition and a selected object of the second reusable objects;

obtaining a review output comprising parameters for modifying the content element definition by using the review input sequence; and generating, based on the review output, a revised content element definition.

15. The one or more non-transitory, machine-readable media of claim 14, wherein:

a first reusable object of the plurality of reusable objects is associated with one or more quality metrics derived from the review output stored in association with the content element definition, and determining the subset of reusable objects comprises adjusting, based on the one or more quality metrics associated with the first reusable object, a selection priority of the first reusable object.

16. The one or more non-transitory, machine-readable media of claim 13, wherein:

the plurality of reusable objects further comprises style-constraint reusable objects that specify constraints on textual characteristics of the generated content elements; and assembling the input sequence for the content generation model comprises inserting, at a first portion of the input sequence, a style-constraint reusable object from the plurality of reusable objects, the style-constraint reusable object specifying a style parameter indicating sentence length parameter or a constraint on the use of specified terms.

17. The one or more non-transitory, machine-readable media of claim 13, wherein the plurality of reusable objects further comprises secondary reusable objects that specify platform-specific implementation templates for the target content element, the operations further comprising:

selecting, based on a platform parameter associated with the target content element, a first object of the secondary reusable objects from the plurality of reusable objects;

assembling a build input sequence to comprise the content element definition and the first object;

obtaining, in response to providing the build input sequence, implementation code for the target content element; and storing the implementation code in association with the content element definition.

18. The one or more non-transitory, machine-readable media of claim 13, wherein:

the inheritance metadata for the plurality of reusable objects comprises a lock flag that indicates that the reusable object is mandatory at the second level; and determining the subset of reusable objects comprises including, in the subset of reusable objects, each reusable object having the lock flag set.

19. The one or more non-transitory, machine-readable media of claim 13, wherein the classification object comprises, for a plurality of taxonomy levels, level definitions that specify sets of permitted linguistic or structural features and validation rules, the operations further comprising:

parsing the content element definition to identify a plurality of features of the content element definition;

determining one or more taxonomy levels, from the plurality of taxonomy levels, that correspond to the subset of specification items based on information in the classification object;

comparing a portion of the plurality of features to the sets of permitted linguistic or structural features associated with the one or more taxonomy levels that correspond to the subset of specification items; and storing the content element definition in association with the subset of specification items in response to determining that the content element definition satisfies the validation rules associated with the one or more taxonomy levels.

20. The one or more non-transitory, machine-readable media of claim 13, wherein a first reusable object of the plurality of reusable objects further comprises a tenant identifier that identifies a tenant associated with the first reusable object, and wherein a second reusable object of the plurality of reusable objects is designated as shared across multiple tenants, and wherein determining the subset of reusable objects comprises:

filtering the plurality of reusable objects based on the tenant identifier to exclude reusable objects associated with tenants other than a tenant associated with the target content element while including the second reusable object; and applying the inheritance metadata to the filtered plurality of reusable objects to determine the subset of reusable objects.

* * * * *